(12) United States Patent
Gilley et al.

(10) Patent No.: US 11,643,817 B2
(45) Date of Patent: May 9, 2023

(54) BUILDING PANELS, ASSEMBLIES, AND ASSOCIATED METHODS

(71) Applicant: Georgia-Pacific Gypsum LLC, Atlanta, GA (US)

(72) Inventors: Stuart Brandon Gilley, Atlanta, GA (US); Charles Richard Harrison, Auburn, AL (US); Hamed Mustafa Kayello, Peachtree Corners, GA (US); Xianyong Wang, Duluth, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

(21) Appl. No.: 16/893,829

(22) Filed: Jun. 5, 2020

(65) Prior Publication Data

US 2020/0385992 A1    Dec. 10, 2020

Related U.S. Application Data

(60) Provisional application No. 62/890,981, filed on Aug. 23, 2019, provisional application No. 62/858,450, filed on Jun. 7, 2019.

(51) Int. Cl.
  *E04C 2/26*   (2006.01)
  *B32B 5/02*   (2006.01)
  (Continued)

(52) U.S. Cl.
  CPC ............... *E04C 2/26* (2013.01); *B32B 5/022* (2013.01); *B32B 5/028* (2013.01); *B32B 5/26* (2013.01);
  (Continued)

(58) Field of Classification Search
  CPC ............. Y10T 442/159; Y10T 442/171; C04B 2111/0062; B32B 13/14; B32B 2262/101; B32B 5/022; B32B 5/028; B32B 5/26; B32B 2255/02; B32B 2255/26; B32B 2307/3065; B32B 2307/734; B32B 2318/04; B32B 2419/06; B32B 2607/00; B32B 2260/021; B32B 2260/023; B32B 2260/044; B32B 2260/046; B32B 2262/0276; B32B 2307/558; B32B 2307/718; B32B 2307/72; B32B 33/00;
  (Continued)

(56) References Cited

U.S. PATENT DOCUMENTS

| 3,944,698 A |   | 3/1976 | Dierks et al. |
|---|---|---|---|
| 4,378,405 A | * | 3/1983 | Pilgrim ................... B28B 5/027 428/322.7 |

(Continued)

FOREIGN PATENT DOCUMENTS

| JP | 2000256048 A | * | 9/2000 | ......... C04B 16/0633 |
|---|---|---|---|---|
| WO | 01049484 A1 | | 7/2001 | |
| WO | 02024424 A1 | | 3/2002 | |

OTHER PUBLICATIONS

G75 (EC968) Single End Yarn (Year: 2014).*

(Continued)

*Primary Examiner* — Elizabeth Mary Cole Imani

(57) ABSTRACT

Building panels, assemblies of building panels, and associated methods are provided. A building panel includes a structural core, such as a set gypsum core, at least one filamentous scrim associated with the core, and a nonwoven mat facer.

32 Claims, 24 Drawing Sheets

(51) Int. Cl.
  *E04C 2/04*    (2006.01)
  *B32B 5/26*    (2006.01)
  *E04D 3/18*    (2006.01)

(52) U.S. Cl.
  CPC ............ *E04C 2/04* (2013.01); *B32B 2255/02* (2013.01); *B32B 2255/26* (2013.01); *B32B 2262/101* (2013.01); *B32B 2307/3065* (2013.01); *B32B 2307/734* (2013.01); *B32B 2318/04* (2013.01); *B32B 2419/06* (2013.01); *B32B 2607/00* (2013.01); *E04D 3/18* (2013.01)

(58) Field of Classification Search
  CPC ........ B32B 2307/54; B32B 2307/5825; B32B 7/12; B32B 17/04; E04C 2/26; E04C 2/04; E04C 2/043; E04C 2/06; E04D 3/18; E04D 3/04; E04D 3/351; E04D 3/36; E04D 13/16; E04B 7/22
  See application file for complete search history.

(56) References Cited

U.S. PATENT DOCUMENTS

| | | | |
|---|---|---|---|
| 4,504,533 A * | 3/1985 | Altenhofer | E04C 2/043 |
| | | | 428/70 |
| 4,647,496 A | 3/1987 | Lehnert et al. | |
| 4,948,647 A * | 8/1990 | Burkard | B32B 13/14 |
| | | | 428/70 |
| 5,319,900 A | 6/1994 | Lehnert et al. | |
| 5,569,430 A | 10/1996 | Callaway et al. | |
| 6,054,205 A | 4/2000 | Newman et al. | |
| 6,342,284 B1 | 1/2002 | Yu et al. | |
| 6,475,313 B1 | 11/2002 | Peterson et al. | |
| 6,594,965 B2 | 7/2003 | Coulton | |
| 6,632,550 B1 | 10/2003 | Yu et al. | |
| 6,893,752 B2 | 5/2005 | Veeramasuneni et al. | |
| 6,995,098 B2 | 2/2006 | Mcgrady et al. | |
| 7,049,251 B2 * | 5/2006 | Porter | B28B 19/0092 |
| | | | 442/79 |
| 7,244,304 B2 | 7/2007 | Yu et al. | |
| 7,425,236 B2 | 9/2008 | Yu et al. | |
| 7,607,270 B2 | 10/2009 | Ehrman et al. | |
| 7,651,564 B2 | 1/2010 | Francis | |
| 7,758,980 B2 | 7/2010 | Yu et al. | |
| 7,858,174 B2 | 12/2010 | Ehrman et al. | |
| 7,861,488 B2 | 1/2011 | Giles et al. | |
| 7,882,671 B2 | 2/2011 | Bruce et al. | |
| 7,897,079 B2 | 3/2011 | Miller | |
| 7,964,034 B2 | 6/2011 | Yu et al. | |
| 8,070,895 B2 | 12/2011 | Engbrecht et al. | |
| 8,142,914 B2 | 3/2012 | Yu et al. | |
| 8,426,017 B2 | 4/2013 | Paradis et al. | |
| 8,500,904 B2 | 8/2013 | Yu et al. | |
| 9,157,231 B2 | 10/2015 | Wingfield et al. | |
| 10,179,997 B2 | 1/2019 | Thomas et al. | |
| 2002/0151240 A1 | 10/2002 | Smith et al. | |
| 2009/0087616 A1 * | 4/2009 | Hennis | B28B 19/0092 |
| | | | 428/141 |
| 2012/0148806 A1 * | 6/2012 | Dubey | B28B 19/0092 |
| | | | 428/193 |
| 2016/0222656 A1 | 8/2016 | Teng et al. | |
| 2017/0030076 A1 | 2/2017 | Li et al. | |
| 2018/0371657 A1 | 12/2018 | Mikulecky et al. | |

OTHER PUBLICATIONS

PCT International Search Report and Written Opinion for PCT/US2020/036274 dated Oct. 9, 2020 (17 pages).
First Office Action and Search Report received for CN application No. 202080038674.4, dated Nov. 18, 2022, 18 pages. (10 pages of English translation and 8 pages of Official copy).
"FM Global Property Loss Prevention Data Sheets", Hail Damage, Factory Mutual Insurance Company, 2018, 22 Pages.
"Test Method for Determining the Susceptibility to Hail Damage of Roof Coverings" Test Procedure, Revision 5, Jun. 29, 2017, 12 Pages.

* cited by examiner

FIG. 34

SINGLE STRESS PLATE FASTENER

| 5/8" GMGB SAMPLE | 120 PSF | 135 PSF | 150 PSF | 165 PSF | 180 PSF | 195 PSF | 210 PSF | 225 PSF | FAILURE MODE |
|---|---|---|---|---|---|---|---|---|---|
| T8(5.75 BIAXIAL) A | | | | | 20 | | | | FASTENER PULL THROUGH PLATE |
| T8(5.75 BIAXIAL) B | | | | | | | 13 | | FASTENER PULL THROUGH PLATE |
| T9(5.75 BIAXIAL) A | | | | | | 7 | | | FASTENER PULL THROUGH PLATE |
| T9(5.75 BIAXIAL) B | | | | | | | 19 | | FASTENER PULL THROUGH PLATE |
| T10(5.75 BIAXIAL) A | | | | | | 57 | | | FASTENER PULL THROUGH PLATE |
| T10(5.75 BIAXIAL) B | | | | | | | 8 | | FASTENER PULL THROUGH PLATE |
| GMGB CONTROL A (NO SCRIM) | | | | 7 | | | | | BOARD |
| GMGB CONTROL B (NO SCRIM) | | 23 | | | | | | | BOARD |

Performance Level — Fail/Pass (Seconds to Failure)

FIG. 35

DOUBLE PLATE FASTENER

| 5/8" GMGB SAMPLE | 120 PSF | 135 PSF | 150 PSF | 165 PSF | 180 PSF | 195 PSF | 210 PSF | 225 PSF | 240 PSF | 255 PSF | 270 PSF | FAILURE MODE |
|---|---|---|---|---|---|---|---|---|---|---|---|---|
| T8(4F) | | | | | | | 44 | | | | | BOARD |
| T8(4F) | | | | | | | 50 | | | | | BOARD |
| T8(5F) | | | 55 | | | | | | | | | BOARD |
| T8(5F) | | | | 3 | | | | | | | | BOARD |
| T8(6F) | | | | | 25 | | | | | | | BOARD |
| T8(6F) | | | | | | | 10 | | | | | BOARD |
| T8(8F) | | | | | | | | | 44 | | | FASTENER PULL THROUGH PLATE |
| T8(8F) | | | | | | | | | | | 26 | BOARD |
| GMGB CONTROL A (NO SCRIM) | | | | 7 | | | | | | | | BOARD |
| GMGB CONTROL A (NO SCRIM) | | 23 | | | | | | | | | | BOARD |

Performance Level — Fail/Pass (Seconds to Failure)

| 4'X4' 5/8" GMGB SAMPLE | PERFORMANCE LEVEL FAIL/PASS (SECONDS TO FAILURE) | | | | | | | | | FAILURE MODE |
|---|---|---|---|---|---|---|---|---|---|---|
| | 105 PSF | 120 PSF | 135 PSF | 150 PSF | 165 PSF | 180 PSF | 195 PSF | 210 PSF | 225 PSF | |
| CONTROL GMGB A | | 21 | | | | | | | | BOARD |
| CONTROL GMGB B | | 27 | | | | | | | | BOARD |
| T7 A (HEAVY NO SCRIM) 4F | | | 2 | | | | | | | BOARD |
| T7 B (HEAVY NO SCRIM) 4F | | | 7 | | | | | | | BOARD |
| T8 A (SCRIM) 4F | | | | | | | | | 47 | BOARD/FASTENER PULL THROUGH PLATE |
| T8 B (SCRIM) 4F | | | | | | | | | 15 | PLATE |
| T8 A (SCRIM) 2F | | | | | | | | 8 | | BOARD/FASTENER PULL THROUGH PLATE |
| T8 B (SCRIM) 2F | | | | | | 7 | | | | BOARD/FASTENER PULL THROUGH PLATE |

FIG. 36

BUILDING PANELS, ASSEMBLIES, AND ASSOCIATED METHODS

CROSS-REFERENCE TO RELATED APPLICATIONS

This application claims priority benefit of U.S. Provisional Application No. 62/858,450, filed Jun. 7, 2019, and U.S. Provisional Application No. 62/890,981, filed Aug. 23, 2019, the disclosures of which are incorporated by reference herein.

BACKGROUND

The present disclosure relates generally to the field of panels and other materials for use in building construction, and more particularly to high strength roofing and sheathing panels, methods of making and installing such panels, and assemblies and systems for their use.

Interior wallboard, exterior building sheathing, flooring, roofing, and other building construction panels can be exposed to extreme environmental conditions including moisture, wind, and extreme temperatures during and after construction. Additionally, such systems may require labor-intensive precision installation, such that improper installation results in improperly sealed, loose, or otherwise weak or penetrable construction assemblies.

In particular, hailstorms are a widespread hazard affecting many areas of the world that can severely damage buildings, roofs, roof-mounted equipment, and other outdoor equipment. Insured losses from hailstorms reached $10 billion in the United States in 2018, for the 11th consecutive year.

Accordingly, it would be desirable to provide construction panels, such as roofing panels, that provide easy installation and improved strength and/or weather resistant properties, including hail resistance.

SUMMARY

In one aspect, building panels are provided. The building panels may include a structural core, such as a set gypsum core. The panels include at least one filamentous scrim associated with the core, the filamentous scrim being a mesh constructed of elongated yarns defining a plurality of openings therebetween. A nonwoven mat facer is associated with the filamentous scrim. In certain embodiments, the building panels are roofing panels.

In another aspect, assemblies and systems of the building panels are also provided.

In yet another aspect, methods of manufacturing building panels are provided. The methods may include associating a filamentous scrim with a nonwoven mat facer, the filamentous scrim comprising a mesh constructed of elongated yarns defining a plurality of openings therebetween, and associating the filamentous scrim and nonwoven mat facer with a core material, such as a gypsum slurry.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

FIG. 34 is a chart showing the results of a wind uplift resistance test described in the Examples;

FIG. 35 is a chart showing the results of a wind uplift resistance test described in the Examples; and FIG. 36 is a chart showing the results of a wind uplift resistance test described in the Examples.

DETAILED DESCRIPTION

Figure 1:
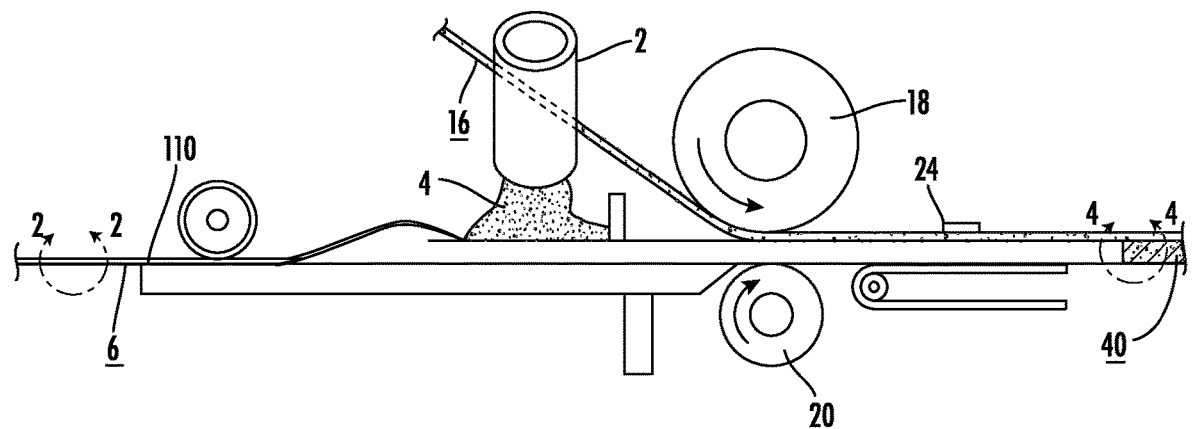
FIG. 1 is a diagrammatic, fragmentary side elevational view illustrating portions of a manufacturing line for producing gypsum panel in accordance with the present disclosure.
Figure 2:
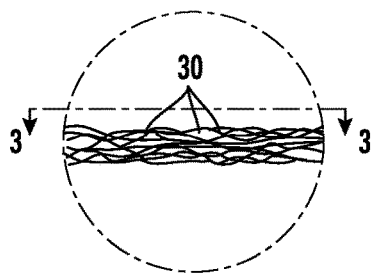
FIG. 2 is an enlarged fragmentary sectional view, taken as indicated toward the left of FIG. 1, of an underlying fiber glass mat used in the manufacture of the gypsum panel.
Figure 3:
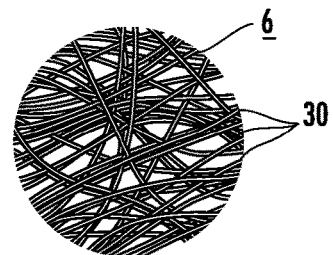
FIG. 3 is a fragmentary plan view taken as indicated by the line 3-3 on FIG. 2.

Construction panels and methods for their manufacture and use are provided herein. Generally, these construction panels may be in the form of any known rigid panels for use in construction, including but not limited to interior wallboard, exterior building sheathing, flooring, and roofing panels. In particular, the present disclosure describes roofing panels having improved strength properties; however, it should be understood that the described panel structure that achieves said improved properties may be similarly incorporated into other types of construction panels.

For example, the panels and materials described herein may be panels for internal or external construction applications, such as for wallboard, external sheathing, roof board, and flooring, sound mitigation and rain screen mats, and other construction applications. For example, the panels described herein may be external gypsum sheathing panels, such as those described in U.S. Pat. No. 10,179,997 and U.S. patent application Ser. No. 15/014,922, both entitled "Gypsum Panels, Systems, and Methods," which are incorporated herein by reference in their entirety. For example, the panels described herein may be fiber-reinforced gypsum panels containing cellulosic fibrous material, such as those described in U.S. Pat. Nos. 6,893,752, 8,070,895, 6,342,284, 6,632,550, 7,244,304, 7,425,236, 7,758,980, 7,964,034, 8,142,914, and 8,500,904, which are incorporated by reference herein in their entirety. For example, the panels described herein may be roof deck panels, such as those described in U.S. Pat. No. 5,319,900, which is incorporated by reference herein in its entirety. For example, the construction materials described herein may be polymeric rain screen or sound mitigation mats, such as those described in U.S. Pat. Nos. 9,157,231 and 7,861,488, which are incorporated by reference herein in their entirety. For example, the panels or construction materials described herein may be gypsum and/or concrete flooring underlayments, such as those described in U.S. Pat. No. 7,651,564, which is incorporated by reference herein in its entirety.

Overall, this disclosure is directed to various construction panels and materials for internal and/or external construction applications, for commercial and/or residential applications, in which the construction panels and/or materials contain one or more of: (i) a filamentous scrim in combination with or adjacent to a nonwoven mat facer, (ii) an elastic/flexible surface coating, and (iii) a relatively high panel core density, to provide enhanced strength and/or hail resistance, including high impact resistance while retaining other physical properties of the panels, such as wind uplift, water resistance, nail pull, flexural, and permeability. In particular, the construction panels disclosed herein may meet the standards of FM 4470 hail resistance classes for Moderate Hail (Class 1-MH), Severe Hail (Class 1-SH), and/or Very Severe Hail (Class 1-VSH) of Factory Mutual (a third-party global certification agency focused on property loss prevention for use in commercial and industrial facilities, including roofing). As will be described below, it has surprisingly been found that the combinations of properties described herein provide a significant improvement in strength and hail resistance properties, without sacrificing other physical panel properties and a significant improvement in panel installation efficiency based on the use of fewer fasteners.

Roofing panels are exposed to extreme weather conditions including wind, rain, hail, and extreme temperatures. On low-slope and no-slope roofs, roofing panels experience suction due to wind patterns travelling over the roof parapet and forming a low pressure point at portions of such roofs. If roof panels or assemblies are not strong enough, such suction may result in uplift and separation of the panels or other portions of the assembly. This phenomenon is increasingly likely in inclement wind conditions, such as hurricanes and tornados. In certain aspects, the present disclosure provides construction panels, such as roofing panels for low or no-slope roofs, which display increased resistance to wind uplift with simpler installation steps. In particular, such construction panels include a set gypsum core, a filamentous scrim associated with the set gypsum core, and a nonwoven mat facer associated with or adjacent to the filamentous scrim. As will be described below, it has surprisingly been found that the combination of a filamentous scrim and a nonwoven mat facer provides a significant improvement in wind uplift resistance in gypsum panels.

In particular, the inventors have surprisingly found that scrims under the face, back, or both the face and back of the glass mat facers on gypsum panels provide increased wind uplift performance and reduced facial indention upon exposure to hail conditions such that these panels achieve the FM-4470 Very Severe Hail (Class 1-VSH). Additionally, the inventors have surprisingly found that standard roofing fasteners are the failure point, when tested under laboratory conditions for wind uplift evaluations, in combination with scrim-containing glass mat panels. In other words, the glass mat panels with scrims can outlast standard roofing fasteners under wind uplift laboratory conditions. This discovery enables the use of fewer fasteners in roofing installations to achieve certified FM wind uplift performance criteria that once required many more roofing fasteners. Furthermore, the use of fewer roofing fasteners and certain geometric installation patterns that achieve equal or better certified FM wind uplift performance can enable faster roofing installation thereby saving significant time and money for the contractor. For example, laboratory testing has demonstrated a four-fold decrease in the number of roofing fasteners using the panels of the instant invention in very high wind uplift laboratory conditions. Thus, fewer roofing fasteners are required per unit area. In a 4'×8 panel, the number of roofing fasteners ranges from 4 to 32, such as 4 to 24 roofing fasteners, 4 to 16 roofing fasteners, 4 to 12 roofing fasteners, or 4 to 8 roofing fasteners. In a 4'×4' panel, the number of roofing fasteners ranges from 2 to 6, such as 2 to 4 roofing fasteners. The skilled artisan understands that the term roofing fasteners includes, but is not limited to, large metal screws with plates of various geometries, thicknesses, and compositions (described herein) either directly attached to the metal screw head or fitted over the screw and slid up to the screw head.

In certain embodiments, the wind uplift performance of the scrim-containing glass mat panels significantly exceeded expectations and in order to derive the overall panel strength, the inventors doubled the number of roofing fastener plates appended to a single fastener. These embodiments enabled extraordinary wind uplift performance with as few as four roofing fasteners in 4'×8' panels.

Roofing panels and assemblies, and methods of making and installing roofing panels and assemblies are described in turn below. Generally, the disclosure will be described with reference to roof deck panels; however, other construction panels, including wallboard and sheathing panels, are envisioned and intended to fall within the scope of this disclosure. Thus, the disclosure of details relating to the roofing panels should be read as being likewise applicable to other such construction panels. The construction panels and other construction materials described herein may provide easy installation and secure construction assemblies.

Construction Panels

Generally, panels in accordance with the present disclosure may include any suitable construction or configuration known in the industry. For example, the panels may be panels that contain gypsum as a significant component of the panel core (e.g., in amounts of up to 85 percent, by weight, or more) or may be panels that contain gypsum as a component of the panel core in combination with other components (e.g., in amounts of less than 85 percent). Examples of other components that may be present in the panel core include, but are not limited to, cementitious materials, magnesium oxide, fly ash, fiberglass, cellulose or other fibers. Furthermore, while the present disclosure is generally directed to building panels (also referred to as "construction panels" herein) that include a gypsum core or layer, other panels may be suitably substituted for the gypsum panel, such as wood-based, foam-based, and other material-based panels that are suitable for the building construction purposes described herein. That is, while various embodiments of the present disclosure are described or illustrated with reference to a gypsum panel, it should be understood that the gypsum core and other panel features could be replaced with suitable components of these other panel or construction material types. In particular, such panels and other materials are described in the documents incorporated by reference herein. For example, these panels and mats may include any suitable panel core (e.g., one or more layers forming the structural core of the panel) along with any suitable facer material or other external coating material, as will be described herein.

Overall, the construction panels, such as roofing panels, described herein may contain any combination of the following features, which will be discussed in turn below: (i) a filamentous scrim in combination with or adjacent to a nonwoven mat facer, (ii) an elastic/flexible surface coating, and (iii) a relatively high panel core density, to provide enhanced hail resistance, including high impact resistance while retaining other physical properties of the panels, such as wind uplift, water resistance, nail pull, flexural, and permeability. In particular, the construction panels disclosed herein may meet the standards of FM 4470 hail resistance classes for Moderate Hail (Class 1-MH), Severe Hail (Class 1-SH), and/or Very Severe Hail (Class 1-VSH). In certain embodiments, the panels meet the Class-1 FM 4470 VSH (Very Severe Hail) standard (last revised 2019).

Under the FM Class 1-VSH testing, 2 in. (51 mm) diameter ice balls are propelled at the assembled roof test samples at a velocity of 152-160 f/s (46-49 m/s) using compressed air to achieve an impact energy of 53-58 ft-lb (72-79 J). Acceptance criteria to achieve a Class 1-VSH rating are to show no signs of cracking or splitting or separating or rupturing on the roof cover, the field seam and the substrate below the roof cover. Minor surface indentation in the substrate are allowed at the point of impact. As described in the examples below, it was surprisingly discovered that combinations of the described features resulted in significant improvements in hail resistance performance. In particular, these results confirmed that combinations of the embedded scrim, heavier core, and/or flexible topcoat allows gypsum boards to provide the excellent VSH resistance performance in a roof assembly system (i.e., minor crack and indentation).

Figure 13:
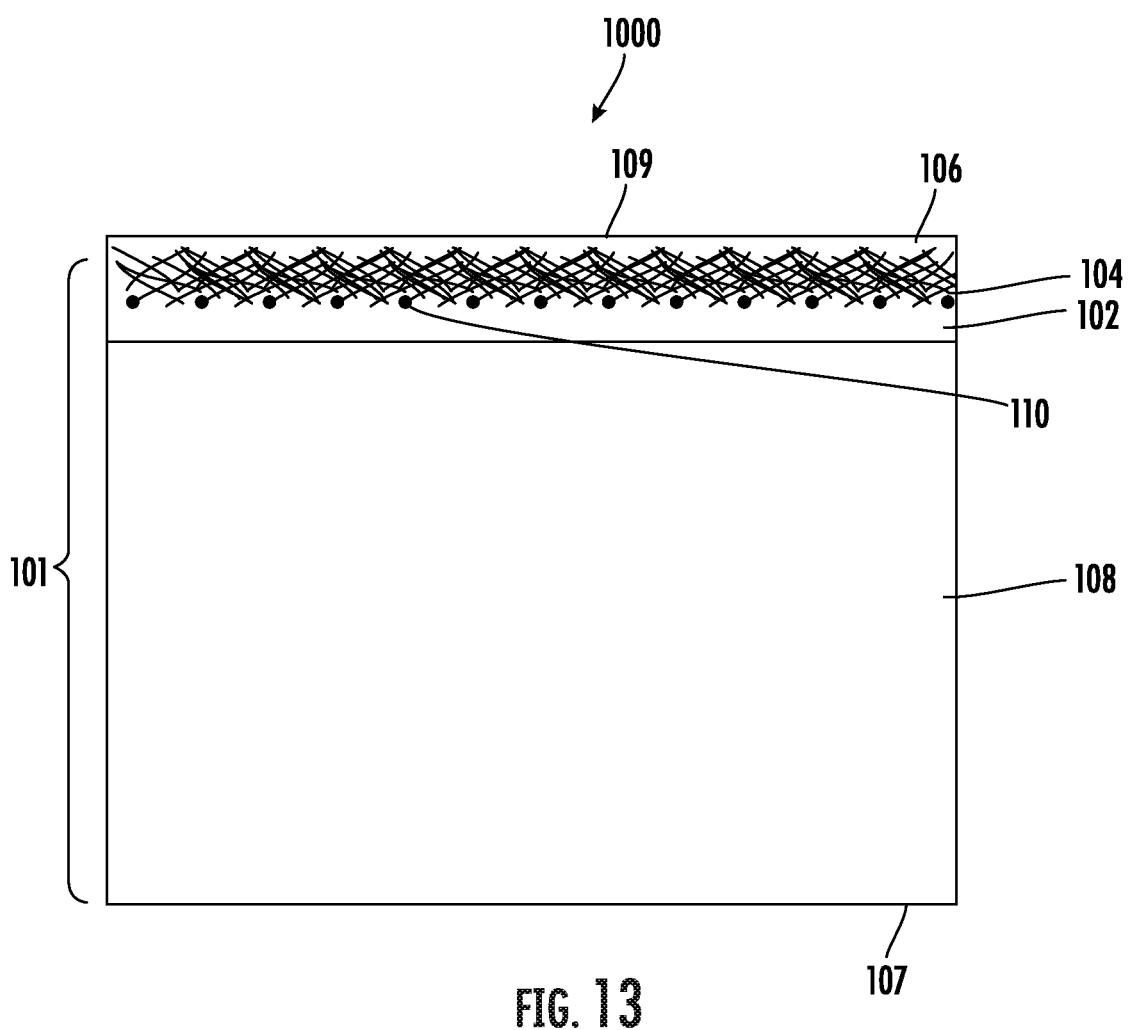
FIG. 13 is a cross-sectional view of a construction panel, such as a roofing panel, in accordance with the disclosure.

In one aspect, construction panels, such as roofing panels, are provided. As shown in FIG. 13, a panel 1000 includes a rigid panel core 101 having a first surface and a second opposed surface. As used here, the term "rigid panel core" refers to a substantially stiff, inflexible panel suitable for typical use as a construction panel (e.g., roofing panel, sheathing panel, wallboard panel). For example, the panel core 101 may be a set gypsum core, such as a fiber-reinforced gypsum core. Panel 1000 also includes a filamentous scrim 110 that is associated with the set gypsum core 101, and a nonwoven mat facer 104 that is associated with the filamentous scrim 110. As used herein, the phrase "associated with" is used broadly to refer to two components being directly or indirectly physically disposed together within the overall panel structure, i.e., being disposed near, adjacent, and/or in contact with one another through any suitable chemical or mechanical means. For example, the filamentous scrim may be embedded in the gypsum core but not in contact with the nonwoven mat facer (i.e., the scrim may be internally spaced from an edge of the gypsum core), or the filamentous scrim may be embedded in the gypsum core and in contact with the nonwoven mat facer, or the filamentous scrim may be laminated to or otherwise coupled to the nonwoven mat facer such that the gypsum core penetrates both the scrim and mat facer. In other embodiments, the scrim may be positioned on an external surface of the nonwoven mat facer, which may or may not be associated with the set gypsum core (i.e., depending on whether the gypsum penetrates fully though the nonwoven mat facer and contacts the scrim).

Figure 14:
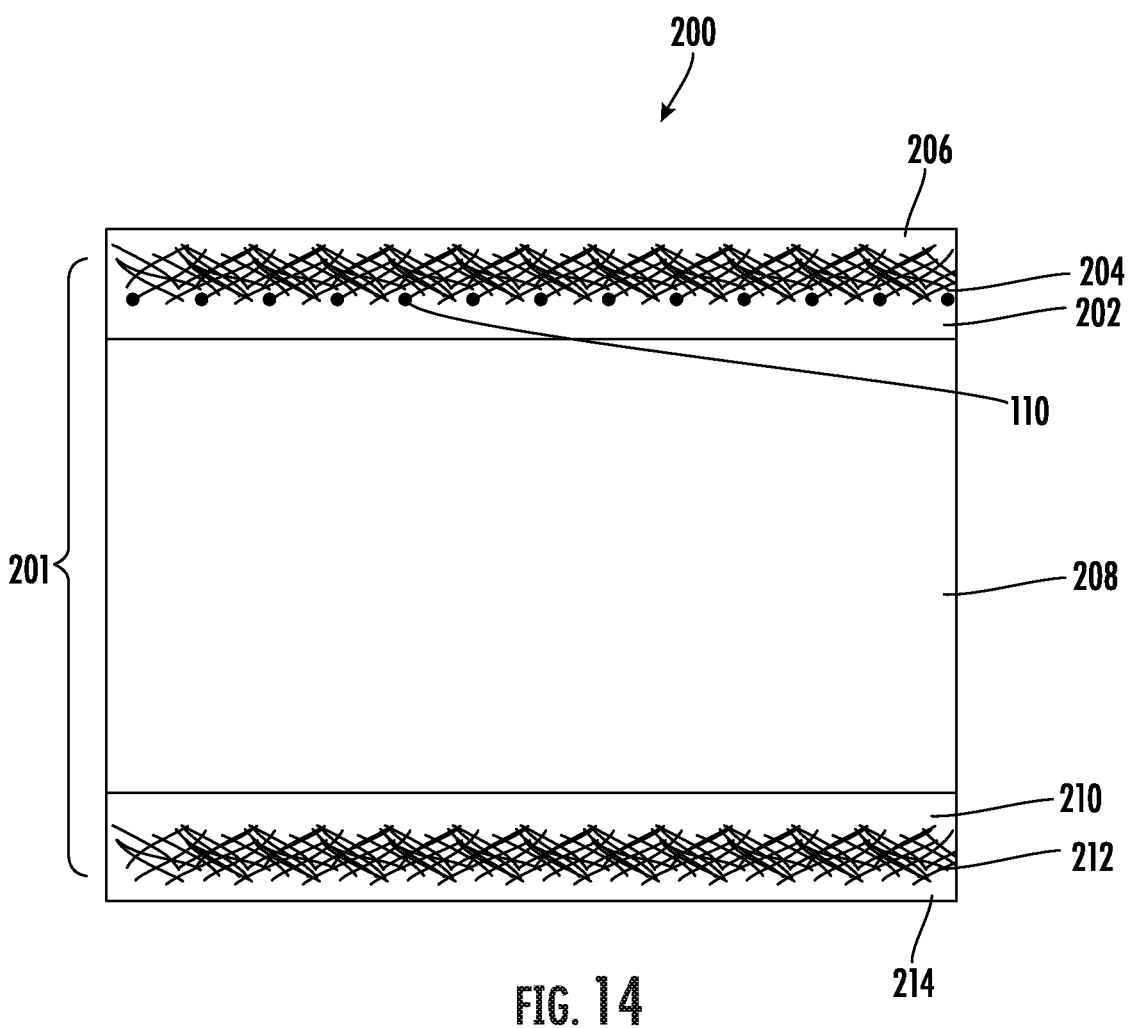
FIG. 14 is a cross-sectional view of another embodiment of a construction panel in accordance with the disclosure.

As shown in FIG. 13, panel 1000 may have two opposed outer surfaces 107, 109. The second outer surface 109 is formed by a coated or uncoated nonwoven mat facer (i.e., the nonwoven mat facer associated with the filamentous scrim), while the first outer surface 107 may be formed by a surface of the gypsum core (as shown in FIG. 13) or a second coated or uncoated nonwoven mat facer (as shown in FIG. 14). Importantly, the second outer surface 109 (i.e., the surface closest to the scrim 110) may be the facing side of the roofing panel, while the opposed first outer surface 107 may be the back side of the roofing panel. For example, the back side of the roofing panel may be a side configured to face an interior of a building on which the roofing panel is installed, upon installation (e.g., a side configured to the associated with an insulating material of a roofing assembly), while the facing side of the roofing panel may be a side configured to receive a membrane, sealant, or other protective covering (e.g., a single-ply roofing membrane) of a roofing assembly. In other embodiments, the filamentous scrim may be associated with the back side of the panel instead of the facing side. In some embodiments, both the facing and back sides may have a filamentous scrim embedded therein.

In certain embodiments, as shown in FIG. 13, the filamentous scrim 110 is positioned between the nonwoven mat facer 104 and the majority of the gypsum core 101. It should be understood that some portion of gypsum from the gypsum core may penetrate the filamentous scrim as well as the nonwoven mat facer.

Figure 27:
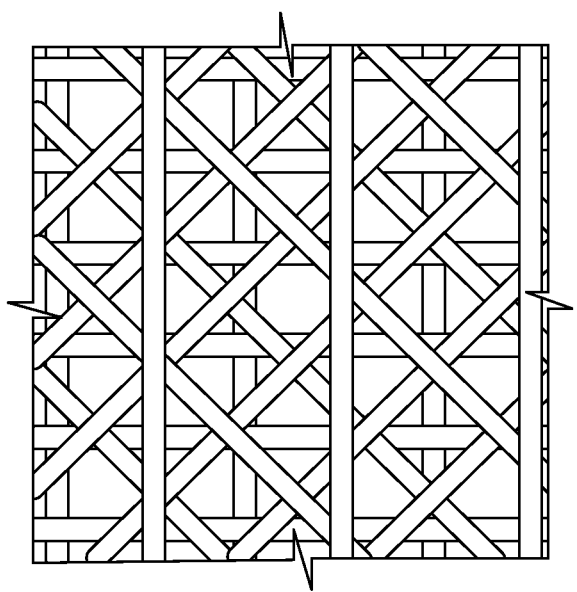
FIG. 27 is a plan view of one embodiment of a filamentous scrim in accordance with the disclosure.

As used herein, the phrase "filamentous scrim" refers to a scrim having a suitable mesh or mesh-like configuration formed by elongated filaments (e.g., fibers or material strands), typically substantially unbroken elongated filaments. The filamentous scrim may have any suitable construction, pattern, or weave configuration. In certain embodiments, the filamentous scrim has a bi-directional, tri-directional, or quad-directional pattern of filaments. For example, a bi-directional scrim has machine and cross machine direction yarns that intersect at 90 degrees (see FIGS. 15 and 16), while a tri-directional scrim has cross machine yarns that intersect machine direction yarns at angles greater and less than 90 degrees, and a quad-directional scrim has two or more bi-directional scrims bonded together at 45 degrees (see FIG. 27). In certain embodiments, the filamentous scrim is a laid scrim, a woven scrim, an unwoven scrim, or a knitted scrim.

Figure 15:
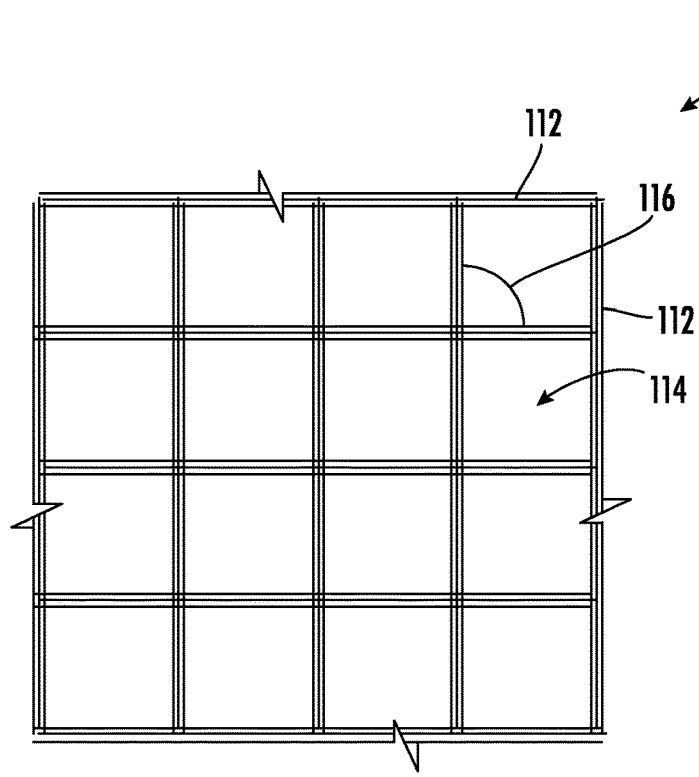
FIG. 15 is a plan view of one embodiment of a filamentous scrim in accordance with the disclosure.
Figure 16:
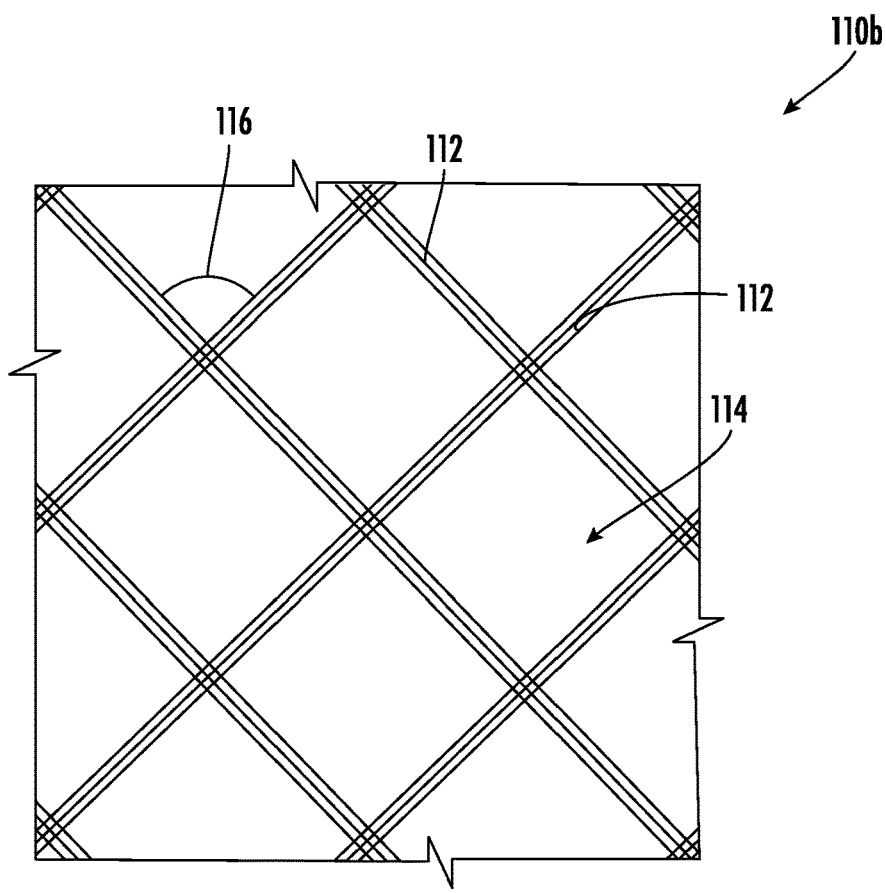
FIG. 16 is a plan view of another embodiment of a filamentous scrim in accordance with the disclosure.

In certain embodiments, the filamentous scrim 110 is a suitable mesh construction of elongated yarns 112 defining a plurality of openings 114 therebetween, such as 110a/b shown in FIGS. 15 and 16. For example, each elongated yarn 112 may be formed of a monofilament or of a plurality of elongated filaments. For example, each elongated yarn 112 may contain from about 4 to about 12 elongated filaments, such as from about 6 to about 8 elongated filaments.

The elongated filaments of the filamentous scrim may be formed of any suitable material, such as fiberglass or suitable polymer materials. In certain embodiments, the filamentous scrim is formed of fiberglass, which may beneficially provide fire resistance, dimensional stability, and water resistance.

If formed by a plurality of elongated filaments, the yarn 112 may include an adhesive material that adheres the plurality of elongated filaments together. For example, the plurality of elongated filaments in each elongated yarn may be adhered together with urea formaldehyde or an acrylic binder, which may or may not contain a biocide material. Such bundles of elongated filaments may have a variety of cross-sectional shapes (round, triangular, square, pentagonal, etc.) although during certain manufacturing processes, the yarns 112 may be at least partially flattened. In certain embodiments, the cross-section is circular.

The elongated filaments and the yarns 112 formed thereof may have any suitable length and diameter, width, and thickness. For example, the elongated filaments may each have a diameter of from about 1 µm to about 100 µm, such as from about 1 µm to about 30 µm. For example, the elongated yarns 112 may have a diameter or width of from about 0.0005 inch to about 0.5 inch, such as from about 0.05 inch to about 0.5 inch, such as from about 0.05 inch to about 0.12 inch. For example, the elongated yarns 112 may have a thickness that is different from the width (i.e. the cross-sectional shape of the yarn may not be symmetric) to create a flattened scrim profile. In such embodiments, the thickness of the elongated yarns 112 may be from about 0.05 inch to about 0.5 inch, such as from about 0.1 inch to about 0.3 inch. As used herein, the term "about" when used with reference to a numerical value, refers to an amount that is plus or minus up to 5 percent of the stated numerical value.

The openings 114 formed between the yarns 112 may be of any suitable shape and dimension based on the particular orientation of the scrim filament bundles. For example, the openings 114 may be rectangular, square, nonrectangular parallelogram, circle, oval, triangle, or other polygon, in shape. For example, each of the openings 114 may have an area from about 0.01 in$^2$ to about 0.5 in$^2$, such as from about 0.018 in$^2$ to about 0.175 in$^2$.

In certain embodiments, the filamentous scrim 110 is formed by disposing a series of yarns 112 in an overlapped or woven-like configuration. The yarns 112 of scrim 110 may be adhered together to maintain their pattern or configuration. For example, the yarns 112 may be adhered to one another with an adhesive material, such as urea formaldehyde or an acrylic binder.

In certain embodiments, as shown in FIGS. 15 and 16, the mesh of the filamentous scrim 110a/b is formed of two sets of approximately parallel elongated yarns 112 spaced from one another, with the two sets being disposed approximately perpendicularly to one another. That is, the yarns may overlap one another to define an intersection angle 116 of about 90 degrees. Of course, in other configurations, the intersection angle may be smaller or greater than 90 degrees. As used herein, the term "approximately" when used to refer to the relative position of materials, such as yarns, is meant to encompass materials having the referenced property or substantially having the referenced property, such as within a 5 percent standard of error.

In certain embodiments, at least one of the two sets of approximately parallel elongated fibers includes the yarns each being spaced from one another at a distance of from about 0.1 inch to about 2 inches. For example, at least one of the two sets of approximately parallel elongated fibers may include the yarns being spaced from one another at a distance of from about 0.1 inch to about 0.5 inch. In some embodiments, both of the two sets of approximately parallel elongated fibers includes the yarns each being spaced from one another at a distance of from about 0.1 inch to about 2 inch, such as from about 0.1 inch to about 0.5 inch.

In some embodiments, the yarn spacing of the two sets of approximately parallel elongated fibers differ in the machine and cross-directions. For example, the yarn spacing in the machine direction may range from about 0.13 inch to about 0.5 inch. For example, the yarn spacing in the cross-direction may range from about 0.14 inch to about 0.35 inch.

In some embodiments, the density of yarns in the scrim is in the range of about 2 to about 8 yarn ends per inch. In certain embodiments, the number of yarn ends per inch differs between the machine and cross-directions of the scrim. In such embodiments, the machine-direction yarns may be present in an amount of from about 3 to about 6 yarn ends per inch, while the cross-direction yarns may be present in an amount of from about 2 to about 8 yarn ends per inch.

Depending on the desired configuration of the filamentous scrim 100 relative to the gypsum panel, each set of approximately parallel elongated yarns 112 may be disposed approximately parallel to at least one lateral edge of the panel (see FIG. 15). That is, the yarns and the edges of the openings formed thereby may be parallel with the lateral edges of the panel. Alternatively, each set of approximately parallel elongated yarns may be disposed at an angle of approximately 45 degrees, relative to at least one lateral edge of the panel (see FIG. 16).

The filamentous scrim 110 may have any suitable weight. For example, the filamentous scrim may have a weight of at least about 4 oz/yd², such as from about 4 oz/yd² to about 25 oz/yd², such as from about 4 oz/yd² to about 10 oz/yd², or from about 4 oz/yd² to about 6 oz/yd². The filamentous scrim 110 may have a tensile strength of from about 30 lbs/in to about 900 lbs/in. The yarns 112 of the filamentous scrim 110 may have an elongation % of from about 3 to about 5.

As described herein and demonstrated by the Examples, it was surprisingly found that the presence of the filamentous scrims embedded in the panel core significantly reduced surface indentation measured in accordance with the FM 4470 test standard, in particular for panels having embedded scrims on the facing side of the panel (e.g., the side configured to face opposite the building on which the panel is installed, such as the surface to which a facing membrane may be applied). For example, the presence of a filamentous scrim embedded at the facing side of the panel was found at least to contribute to a panel meeting the FM 4470 Very Severe Hail (Class 1-VSH) standard.

As described above, in certain embodiments, the construction panels of the present disclosure contain a filamentous scrim 110 in combination with a nonwoven mat facer 104, as shown in FIG. 13. The phrases "nonwoven mat facer", "nonwoven fibrous mat", "facer material mats" and the like are used interchangeably herein. In certain embodiments, the facer material is a nonwoven fibrous mat formed of fiber material that is capable of forming a strong bond with the material of a building panel core through a mechanical-like interlocking between the interstices of the fibrous mat and portions of the core material. Examples of fiber materials for use in the nonwoven mats include mineral-type materials such as glass fibers, synthetic resin fibers, and mixtures or blends thereof. Both chopped strands and continuous strands may be used.

In certain embodiments, the nonwoven mat facer 104 is a nonwoven fiberglass mat formed of a plurality of glass fibers. For example, the glass fibers may have an average diameter of from about 1 to about 17 microns and an average length of from about 1/16 inch to about 1 inch. For example, the glass fibers may have an average diameter of 13 microns (i.e., K fibers) and an average length of ¾ inch. In certain embodiments, the non-woven fiberglass mats have a basis weight of from about 1.5 pounds to about 4.0 pounds per 100 square feet of the mat. The mats may each have a thickness of from about 10 mils to about 50 mils. The fibers of the nonwoven mat facer 104 may be bonded together to form a unitary mat structure by a suitable adhesive. For example, the adhesive may be a urea-formaldehyde resin adhesive, optionally modified with a thermoplastic extender or cross-linker, such as an acrylic cross-linker, or an acrylate adhesive resin.

Figure 4:
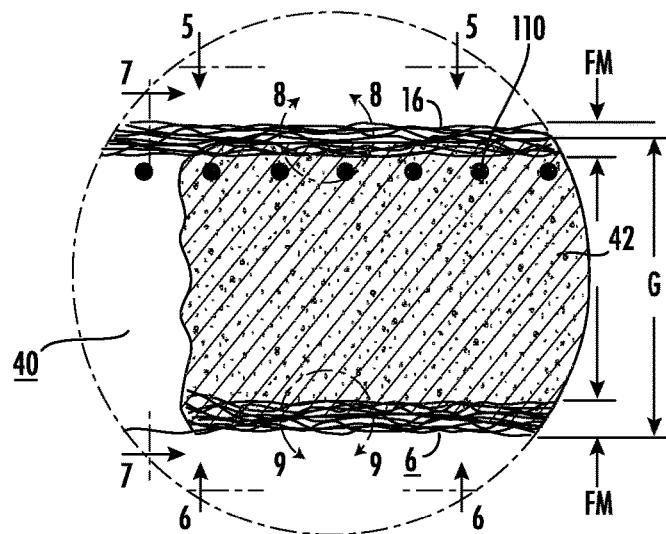
FIG. 4 is an enlarged sectional view taken as indicated toward the right on FIG. 1 and illustrating both underlying and overlying fiber glass mats, with intervening gypsum composition, used in the manufacture of the panel.
Figure 5:
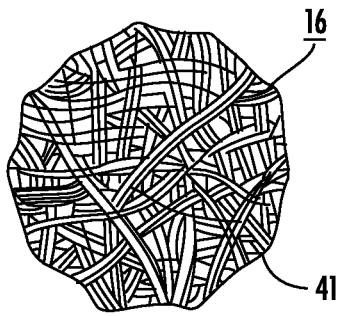
FIG. 5 is a fragmentary plan view taken as indicated by line 5-5 on FIG. 4.
Figure 6:
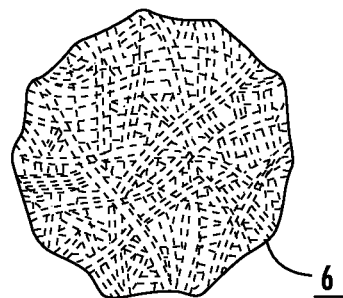
FIG. 6 is a fragmentary bottom view taken as indicated by the line 6-6 on FIG. 4 and illustrating the bottom surface of the underlying mat of the panel.
Figure 7:
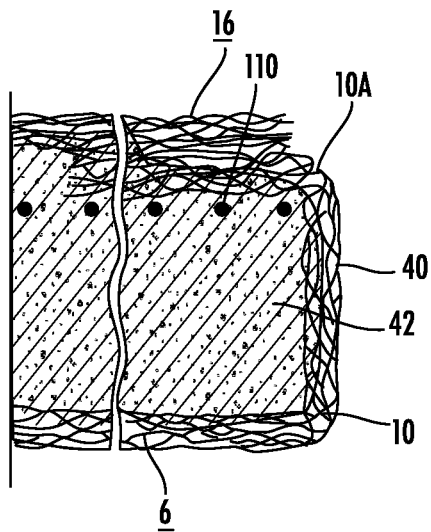
FIG. 7 is a transverse sectional view of an edge portion of the completed panel, this view being taken as indicated by the line 7-7 on FIG. 4.
Figure 8:
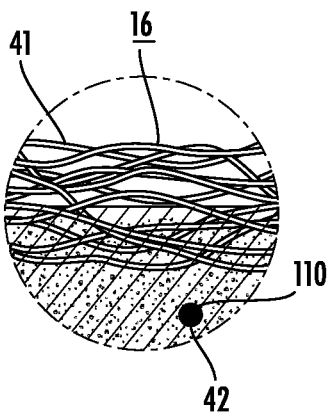
FIG. 8 is a further enlarged fragmentary sectional view taken as indicated toward the top of FIG. 4.
Figure 9:
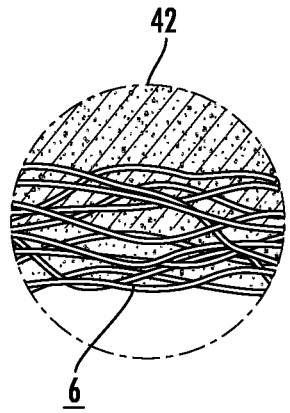
FIG. 9 is a further enlarged fragmentary sectional view taken as indicated toward the bottom of FIG. 4.

In certain embodiments, as shown in FIGS. 1-4, facer material mats 6 and 16, contain glass fiber filaments 30 oriented in random pattern and bound together with a resin binder (not shown). One embodiment of glass fiber mat-faced gypsum board 40 is shown in FIGS. 4 and 7, in which the set gypsum of the core 42 penetrates substantially through the thickness of the mat 6 over substantial area portions thereof and in which the set gypsum of the core 42 penetrates the mat 16 partially, with the surface being thus substantially free of set gypsum. The substantially gypsum-free surface of mat 16, as seen in FIG. 8, is highly textured, and provides an excellent substrate for adhering thereto an overlying component, such as the elastic/flexible coatings discussed herein, inasmuch as it contains many interstices into which an adhesive composition can flow and bond.

In some embodiments, as shown in FIG. 13, gypsum of the gypsum core 101 penetrates a remaining portion of the first fiberglass mat 104 such that voids in the first fiberglass mat 104 are substantially eliminated. For example, in one embodiment, the first fiberglass mat 104 has an elastic/flexible coating 106 on a surface opposite the gypsum core 101. For example, the elastic/flexible coating 106 may form the outermost surface or topcoat of a set panel. That is, the elastic/flexible coating 106 may be applied during manufacture of the panel (on or off-line from the other panel manufacturing steps as discussed in greater detail with respect to the methods of manufacture herein, and prior to installation of the panel in a building construction (e.g., in a roof assembly). In other embodiments, the fiberglass mats are pre-coated In some embodiments, the elastic/flexible coating 106 penetrates a portion of the first fiberglass mat 104, to define the remaining portion of the first fiberglass mat 104 as well as an external surface of the panel. That is, gypsum crystals of the gypsum core 101 may penetrate a remaining fibrous portion of the first fiberglass mat 104 such that voids in the first fiberglass mat 104 are substantially eliminated. As used herein the phrase "such that voids in the fiberglass mat are substantially eliminated" and similar phrases refer to the gypsum slurry (e.g., slate coat) filling all or nearly all of the interstitial volume of the fiberglass mat that is not filled by the coating material. For example, panels and methods of making panels having reduced void volume are described in U.S. Pat. No. 10,179,997, issued Jan. 15, 2019, the disclosure of which is incorporated by reference herein in its entirety.

As used herein, the terms "elastic coating," "flexible coating," and the like, refer to a coating material that is substantially uninterrupted over a surface of the panel, other than any pinholes and/or other microchannels present in the coatings, and that provides a requisite balance of rigid/structural and flexible properties to provide the desired coating properties (e.g., enhanced crack resistance). For example, pinholes or microchannels may provide for release of moisture from the panel core, across the coating. The elastic/flexible coating on the external surface of the facer may be any suitable coating known in the art, such as a coating containing latex, an acrylic elastomer, and/or other known coating materials, including those described in the Examples. For example, suitable flexible/elastic coatings may include or be based on chemistry including (i.e., have as a set coating precursor) acrylic latex, polyurethane dispersion, polyvinyl butyral, styrene-butadiene copolymer latex, styrene-acrylic copolymer latex, and styrene-vinyl-acrylic copolymer latex chemistries, among others. In certain embodiments, the flexible coating contains: an elastomeric acrylic co-polymer/resin, polyvinyl butyral, polyurea/polyurethane hybrid, polyurethane elastomer, synthetic rubber, and/or a rubberized/elastomeric coating material.

In certain embodiments, the coating may include a binder material and, optionally, a filler. For example, the coating may include a polymer or resin based binder material along with one or more inorganic fillers.

The elastic coating may have good film formation properties at ambient conditions and may have excellent water resistance and UV resistance. In certain embodiments, the elastic coating displays at least about 50% elongation. In certain embodiments, the elastic coating displays a tensile strength of at least 200 psi. In certain embodiments, the elastic coating displays a tear strength of at least about 50 psi. In certain embodiments, the elastic coating has a Shore hardness rating of from about 18A to about 72A.

The elastic coating may be present on the panel in any suitable amount and/or thickness, to provide the desired properties. For example, the elastic coating may have a thickness of from about 1 mil to about 30 mils. For example, the elastic coating may be present in a weight of from about 10 lbs/msf to about 200 lbs/msf, such as from about 10 lbs/msf to about 165 lbs/msf, such as from about 25 lbs/msf to about 165 lbs/msf. It is envisioned that higher coating weights may also be used.

As described herein and demonstrated by the Examples, it was surprisingly found that the presence of elastic/flexible coatings of the types described herein significantly improved the surface crack resistance, indentation resistance, and water resistance of the board. That is, the presence of an elastic/flexible coating of this type was found at least to contribute to a panel meeting the FM 4470 Very Severe Hail (Class 1-VSH) standard.

In certain embodiments, the construction panels described herein have a relatively high core density. For example, gypsum panel cores may have a density (of the core overall of a majority layer thereof, as described below) of from about 45 lbs/ft$^3$ to about 80 lbs/ft$^3$, such as from about 48 lbs/ft$^3$ to about 68 lbs/ft$^3$, such as from about 52 lbs/ft$^3$ to about 63 lbs/ft$^3$. For example, the construction panels described herein may have a panel weight from about 1,100 lbs/msf to about 3,500 lbs/msf, depending on panel thickness. For example, for panels having a thickness of about ¼ inch, the overall panel weight may be from about 1,100 lbs/msf to about 1,500 lbs/msf. For example, for panels having a thickness of about ⅝ inch, the overall panel weight may be from about 2,500 lbs/msf to about 3,500 lbs/msf, such as from about 2,900 to about 3,300 lbs/msf. For example, core or core layer density can be controlled by adjusting foam and stucco addition rates during manufacturing (e.g., heavier cores contain less foam and more stucco).

While lighter weight boards having the filamentous scrim and/or flexible/elastic coating may display improved hail resistance, it was surprisingly found that increased panel density in the aforementioned range provides further improvements to hail damage resistance properties in accordance with the FM 4470 test standard. For example, such increased panel core densities were found at least to contribute to a panel meeting the FM 4470 Very Severe Hail (Class 1-VSH) standard.

In certain embodiments, as shown in FIG. 13, the gypsum core 101 includes two or more gypsum layers 102, 108, while in other embodiments the gypsum core includes a single gypsum layer. For example, the gypsum core may include various gypsum layers having different compositions. In some embodiments, the first gypsum layer 102 that is in contact with the filamentous scrim 110 and the nonwoven mat facer 104 (i.e., the layer that forms an interface with the coating material and at least partially penetrates the remaining fibrous portion of the nonwoven mat) is a slate coat layer. In some embodiments, the first gypsum layer 102 is present in an amount from about 2 percent to about 20 percent, by weight, of the gypsum core 101. The various gypsum layers are shown as separate layers in the figures for ease of illustration; however, it should be understood that overlap of these materials may occur at their interfaces.

The layer(s) of the gypsum core may be similar to gypsum cores used in other gypsum products, such as gypsum wallboard, drywall, gypsum board, gypsum lath, and gypsum sheathing. For example, the gypsum core may be formed by mixing water with powdered anhydrous calcium sulfate or calcium sulfate hemihydrate, also known as calcined gypsum or stucco, to form an aqueous gypsum slurry, and thereafter allowing the slurry mixture to hydrate or set into calcium sulfate dihydrate, a relatively hard material. In certain embodiments, the gypsum core includes about 80 weight percent or above of set gypsum (i.e., fully hydrated calcium sulfate). For example, the gypsum core may include about 85 weight percent set gypsum. In some embodiments, the gypsum core includes about 95 weight percent set gypsum. The gypsum core may also include a variety of additives, such as accelerators, set retarders, foaming agents, and dispersing agents.

In certain embodiments, the gypsum core or a majority layer thereof contains (i) siloxane in an amount of from about 5 lbs/msf to about 15 lbs/msf, (ii) siliconate in an amount of from about 1 lbs/msf to about 10 lbs/msf, or both. It has been found that the inclusion of such additives may result in a construction panel displaying 10%, 5%, or lower water absorption rate over two-hours, when tested according to ASTM C473 to meet ASTM C1177 requirements.

In certain embodiments, as shown in FIG. 14, a gypsum panel 200 includes two nonwoven facers 204, 212 that are associated with the gypsum core 201. As with the first facer material, the second facer material may be formed from any suitable fibrous materials. In certain embodiments, both facers 204, 212 are fiberglass mats. The second mat 212 is present on a face of the gypsum core 201 opposite the first fiberglass mat 204. In some embodiments, only the first mat 204 has an elastic/flexible coating 206 on a surface thereof. In other embodiments, both mats 204, 212 have a coating 206, 214 on a surface thereof opposite the gypsum core 201. In still other embodiments, no elastic/flexible coating is present. In some embodiments, the gypsum core 201 includes three gypsum layers 202, 208, 210. One or both of the gypsum layers 202, 210 that are in contact with the fiberglass mats 204, 212 may be a slate coat layer.

In each of the illustrated embodiments, the construction panels are shown with a single filamentous scrim 110 associated with a nonwoven mat facer, however as explained above, it is envisioned that two filamentous scrims 110 may be provided, in embodiments having two nonwoven mat facers.

In certain embodiments, the panels have a thickness from about ¼ inch to about 1 inch, such as ¼ inch, ½ inch, ⅝ inch, or 1 inch. For example, the panels may have a thickness of from about ½ inch to about ⅝ inch.

As demonstrated by the Examples, fewer roofing fasteners are required per unit area utilizing the panels described herein. In a 4'×8' panel, the number of roofing fasteners ranges from 4 to 32, such as 4 to 24 roofing fasteners, 4 to 16 roofing fasteners, 4 to 12 roofing fasteners, or 4 to 8 roofing fasteners. In a 4'×4' panel, the number of roofing fasteners ranges from 2 to 6, such as 2 to 4 roofing fasteners. The skilled artisan understands that the term roofing fasteners includes, but is not limited to, large metal screws with plates of various geometries, thicknesses, and compositions (described herein) either directly attached to the metal screw head or fitted over the screw and slid up to the screw head.

In certain embodiments, the construction panels are roofing panels and display a wind uplift resistance of at least 195 lb/ft$^2$, for a ⅝ inch panel secured with fewer than 12 fasteners, such as secured with 8 or 4 fasteners. In certain embodiments, the roofing panels described herein may display a wind uplift resistance of at least 240 lb/ft$^2$, for a ⅝ inch panel secured with fewer than 12 fasteners, such as secured with 8 or 4 fasteners.

In certain embodiments, the construction panels are roofing panels and display a wind uplift resistance of at least 150 lb/ft$^2$, for a ½ inch panel secured with fewer than 12 fasteners, such as secured with 8 or 4 fasteners. In certain embodiments, the roofing panels described herein may display a wind uplift resistance of at least 195 lb/ft$^2$, for a ½ inch panel secured with fewer than 12 fasteners, such as secured with 8 or 4 fasteners.

In certain embodiments, the construction panels are roofing panels and display a wind uplift resistance of at least 120 lb/ft$^2$, for a ¼ inch panel secured with fewer than 12 fasteners, such as secured with 8 or 4 fasteners. In certain embodiments, the roofing panels described herein may display a wind uplift resistance of at least 150 lb/ft$^2$, for a ¼ inch panel secured with fewer than 12 fasteners, such as secured with 8 or 4 fasteners.

Thus, the panels having a filamentous scrim described herein may display higher wind uplift resistance than an otherwise identical but scrimless panel secured with the same number of fasteners in an identical roof assembly. Alternatively, the panels described herein may display a similar wind uplift resistance to an otherwise identical but scrimless panel secured with a higher number of fasteners in an identical roof assembly. Beneficially, the need for fewer fasteners when installing the panels described herein requires fewer installation steps and materials.

Assemblies/Systems of Panels

In certain embodiments, as shown in FIGS. 10-14 and 17-18, the panel may be a roof deck panel. For example, installation of a roof deck assembly or system in construction of a building, generally involves constructing a frame for support of the roof of a building; affixing to the frame corrugated sheets to provide a surface for support of the other components of the roof deck system; affixing to the corrugated sheets planar support members; and affixing to the planar support members an exterior finishing material having good weathering properties. Roof deck systems which include panels of insulation sandwiched between the aforementioned corrugated sheets and planar support members are used widely also. Such systems are designed to be insulative in character and weather resistant. Such roof deck systems can be used to advantage to conserve energy used for heating and to conserve energy used for air-conditioning.

More specifically, such roof deck systems typically include corrugated metal sheets which are mechanically affixed, usually by screws or bolts, to appropriate structural members of the building such as steel beams. The corrugated metal sheets support the weight of the components that overlie it, including the insulating material (when used), the planar support members, and the finishing material. Lightweight, low density insulating panels such as expanded polystyrene, polyisocyanurate, and the like, are used widely in such systems, especially in colder climates. The planar support members generally include gypsum boards and are fastened in place by mechanical fasteners such as screws to the underlying corrugated metal sheet. When panels of insulation are used, they are sandwiched between the underlying corrugated metal sheets and the overlying panels of gypsum board. An exterior finishing material, such as a polymeric or rubber membrane or alternating layers of asphalt and roofing felt, overlies the panels of gypsum board.

Figure 10:
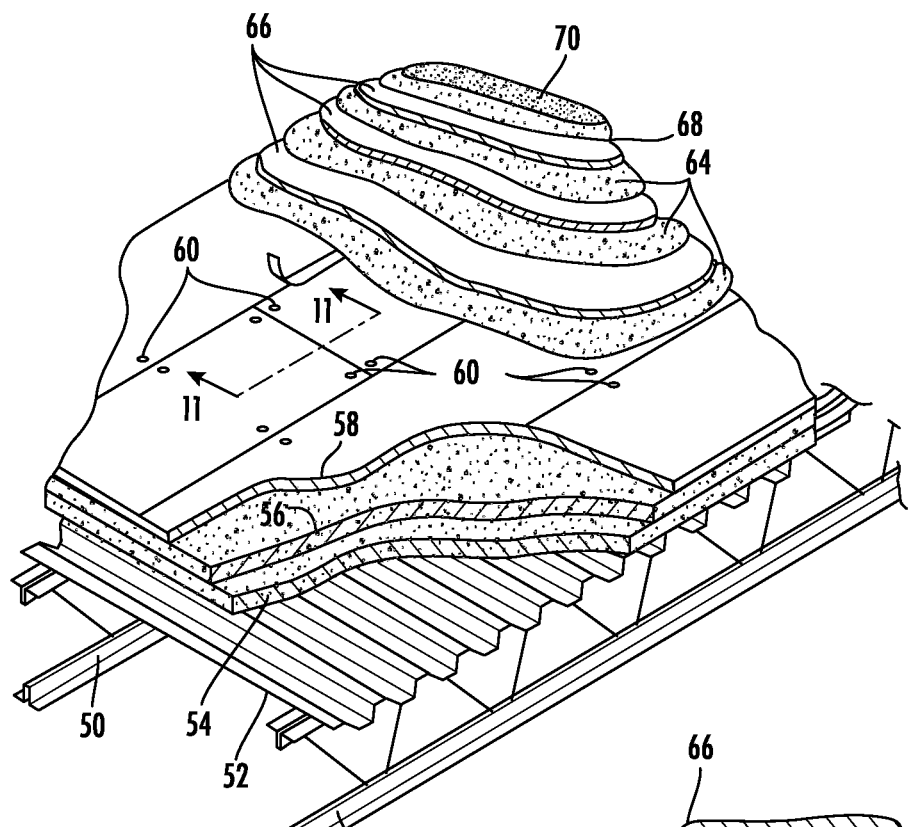
FIG. 10 is a perspective view partly broken away and in section of an exemplary roof deck assembly incorporating a panel in accordance with the present disclosure.

A typical roof deck system incorporating the fibrous mat-faced gypsum board as described above is shown in FIGS. 10 to 12. In this construction, spaced parallel trusses 50 extending between building support members (not shown) support a corrugated metal deck 52 that is welded or otherwise fastened to the trusses. Layers 54 and 56 of insulating sheet material, which may, for example, be of polyisocyanurate, are disposed on the corrugated metal deck. A layer 58 of fibrous mat-faced gypsum board panels of the type described herein are secured to the corrugated deck 52 by means of fasteners 60 passing therethrough and through the underlying insulation layers 54 and 56 into the deck 52. The joints of the panel layer 58 are sealed by application of tape 62, as shown in FIG. 10 with respect to one of the panel joints. Overlying the gypsum layer 58 is a waterproof roofing membrane including alternate layers of asphalt 64 and roofing felt 66, three layers of each being shown in the present example. A final coating of asphalt 68 is covered with a crushed gravel topping layer 70.

Figure 12:
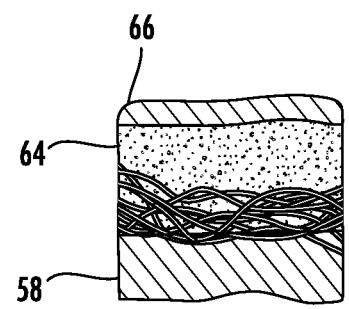
FIG. 12 is a greatly enlarged sectional view of the circled area of FIG. 11 showing the penetration of the first asphalt layer into the fibrous upper surface of the panel in accordance with the disclosure.
Figure 11:
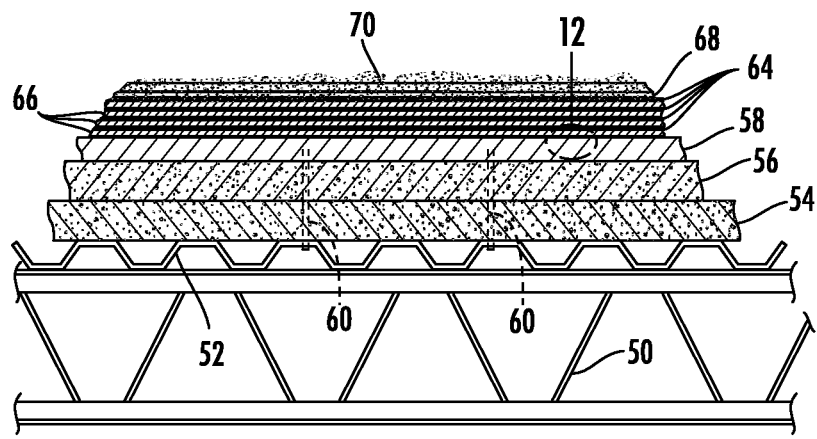
FIG. 11 is an enlarged sectional view taken along line 11-11 of FIG. 10.

In the enlarged view of FIG. 12, the manner in which the first asphalt layer 64 penetrates into the upwardly facing fibrous mat-face of the gypsum board panel layer 58 is illustrated. This penetration assures a secure adhesion of the waterproof membrane to the structural layers of the roof system.

In some embodiments, fasteners 60 of various geometries, thicknesses, and compositions can be used with the gypsum panels of the invention for mechanical fastening. Typical roofing fasteners are known from commercial roofing accessories manufacturers. It is known by those skilled in the art to select fasteners that are stronger than the gypsum panels for use in roofing applications. Fasteners 60 can be selected from, but not limited to, geometries that comprise round, square, pentagonal, hexagonal, and further multi-edged with centrally located screws with which to drive through the entire roof deck assembly (FIGS. 10 and 18) into the lower metal decking or cement and hold in place under low pressure environmental conditions. Certain embodiments of fasteners 60 shape can be round, square, and hexagonal. Fastener thicknesses can range from about 0.01 to 0.2 inches, including from 0.02 to 0.05 inches. Fastener 60 diameters can range from 1.5 inches to 6 inches, including from 2 inches to 4 inches, such as 3 inches. Fastener 60 compositions can be, but not limited to, stainless steel, carbon steel, carbon steel coated with alloys of aluminum and magnesium, alloys of steel and zinc, other metals that are resistant to corrosion, and polymer, such as, but not limited to, polypropylene and nylon.

Figure 17:
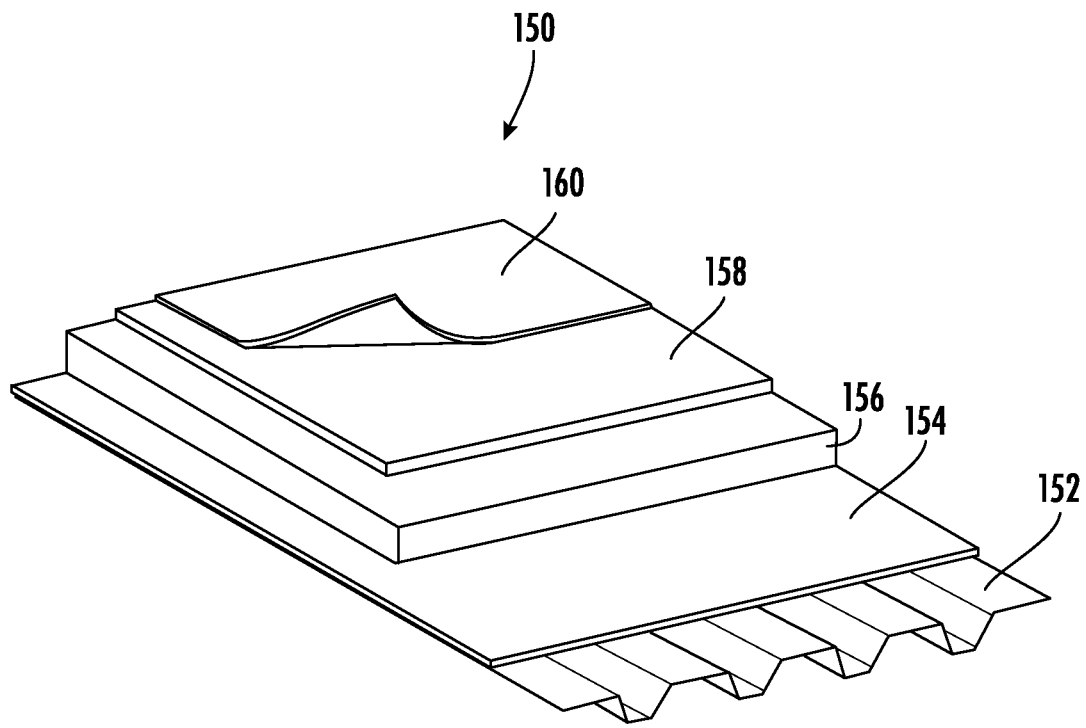
FIG. 17 is a perspective view of a roof deck assembly in accordance with the disclosure.
Figure 18:
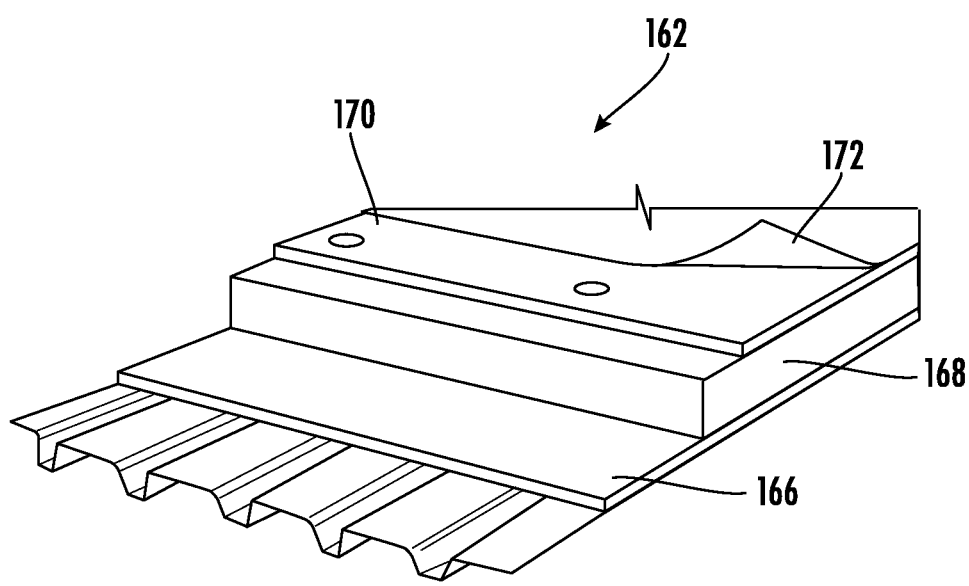
FIG. 18 is a partial perspective view of another embodiment of a roof deck assembly in accordance with the disclosure.

In some embodiments, as shown in FIG. 17, the roof deck system 150 incorporating the gypsum panels includes a gypsum roof board/panel, as an overlayment 158, underlayment 154, or both, as well as insulation 156, and a roof covering or membrane 160, mounted on a steel, wood, or other roof deck 152 (shown as steel). In some embodiments, as shown in FIG. 18, the roof deck system 162 incorporating the gypsum panels is a single-ply membrane system. For example, the system may include at least one gypsum roof panel 166, 170, insulation 168, and a single-ply membrane 172 (e.g., a thermoplastic polyolefin (TPO), polyvinyl chloride (PVC), or ethylene propylene diene terpolymer (EPDM) membrane). Various embodiments of such roofing systems utilizing gypsum roofing panels are known in the art and the present disclosure is meant to encompass any such suitable system configurations or designs incorporating the gypsum panels disclosed herein. For example, the roofing system may incorporate suitable asphalt, EPDM, Turbo Seal, CSPE, Modified Bitumen, PVC, cold liquid membranes, FTPO, TPO, coal-tar pitch built up, or other built up roof constructions, among others.

Thus, the construction panel 1000 may be configured to be secured to or within a suitable construction assembly or substrate. For example, the construction panel 1000 may be a roofing panel configured to be secured within a standard roofing assembly, such as a fastener plate or adhesive style of roof assembly, as described above. For example, within a roofing assembly, as shown in FIG. 13, the surface 109 of the panel 1000 nearest the filamentous scrim 110 may be the facing surface opposite the bottom or back surface 107 that interfaces with the substrate (e.g., that interfaces with a roof deck or insulation layer). For example, a suitable insulation layer may include an Expanded Polystyrene (EPS), Extruded Polystyrene (XPS), or Polyisocyanurate (Polyiso, ISO) layer. For example, other substrate materials to which the panel may be attached include steel, wood, concrete, gypsum, cementitious wood fiber, composite, or thermoset, as well as other membranes.

That is, the surface 109 adjacent (or nearest) the filamentous scrim may be associated with the roof structure such that the surface is configured to receive any suitable single-ply membrane or other roof assembly layers. Thus, a roofing assembly may include one of the improved hail resistant panels described herein positioned between an insulating layer on the back side of the roofing panel and a single-ply membrane on the facing side of the roofing panel. In certain embodiments, the roofing assembly may further include a plurality of fasteners securing the at least one roofing panel within the roofing assembly. In certain embodiments, the at least one roofing panel is adhered within the roofing assembly (i.e., no mechanical fasteners are used to mechanically secure the panel within the assembly).

As discussed above, in certain embodiments the surface 109 adjacent the filamentous scrim is associated with or faces an insulation layer, such as a polyisocyanurate board foam layer. In certain embodiments, the roofing assembly includes a plurality of fasteners that secure the roofing panel within the roofing assembly. In certain embodiments, a membrane is provided to cover or seal the roofing assembly. For example, a membrane may be associated with a second surface 107 of the panel 1000 opposite the first surface 109 (e.g., opposite the surface nearest the scrim). For example, the panel may be configured to be secured to insulation (such as Expanded Polystyrene (EPS), Extruded Polystyrene (XPS), Polyisocyanurate (Polyiso, ISO) or other substrate materials such as steel, wood, concrete, gypsum, cementitious wood fiber, composite, or thermoset, as well as other membranes.

Such construction assemblies containing the high strength panels with filamentous scrim may display improved weather, hail, and wind resistance including increased uplift tolerance. For example, the panels having a filamentous scrim described herein may display higher wind uplift resistance than an otherwise identical but scrimless panel secured with the same number of fasteners in an identical roof assembly. Alternatively, the panels described herein may display a similar wind uplift resistance to an otherwise identical but scrimless panel secured with a higher number of fasteners in an identical roof assembly. As is discussed in greater detail with reference to the methods of installation, the panels may provide improved hail and/or wind uplift resistance without requiring additional installation steps.

Methods of Making Panels

Methods of manufacturing the construction panels described herein are also provided. The methods may include one or more of: (i) associating a filamentous scrim with a nonwoven mat facer, (ii) applying an elastic/flexible surface coating to form a surface of the panel, and (iii) forming a panel core having a relatively high panel core density, to provide enhanced hail resistance, including high impact resistance while retaining other physical properties of the panels, such as wind uplift, water resistance, nail pull, flexural, and permeability. In particular, these methods may result in the construction panels disclosed herein, which meet the standards of FM 4470 hail resistance classes for Moderate Hail (Class 1-MH), Severe Hail (Class 1-SH), and/or Very Severe Hail (Class 1-VSH).

In certain embodiments of manufacturing a gypsum panel, a gypsum slurry may be deposited on or otherwise brought into contact with the filamentous scrim, which itself is associated with the nonwoven mat facer. As discussed above, the gypsum slurry may penetrate some volume of the interstitial or open volume defined by the filamentous scrim and/or nonwoven mat facer (e.g., some open volume of these components that is not otherwise penetrated by a continuous mat coating or other coating or adhesive material, to provide a mechanical bond for the panel.

In certain embodiments, the nonwoven mat facer and the filamentous scrim are associated simultaneously (i.e., at substantially the same time or during substantially the same process) with the filamentous scrim and the gypsum slurry. For example, a roll of filamentous scrim and a roll of the nonwoven mat facer material may be simultaneously unwound and positioned adjacent one another to provide a web onto which the gypsum slurry is deposited. In other embodiments, the nonwoven mat facer and the filamentous scrim are associated prior to their association with the gypsum slurry (e.g., offline from the gypsum panel manufacturing process). For example, the filamentous scrim and nonwoven mat facer material may be mechanically and/or chemically associated using an adhesive or other suitable means and then the combined scrim and mat facer may be unwound from a roll to provide a web onto which the gypsum slurry is deposited. For either embodiment, the nonwoven mat facer may be coated or uncoated at the time of combination with the scrim and/or gypsum slurry.

As described above, the scrim may be made by adhering a plurality of elongated yarns into the desired mesh pattern, such as with urea formaldehyde or an acrylic binder. Each yarn may be a monofilament or a plurality of associated filaments. For example, each yarn may be a bundle of filaments that are adhered together prior to or simultaneously with the yarns being adhered together, such as with urea formaldehyde or an acrylic binder. During processing, the yarn may be flattened out from the described yarn dimensions.

As discussed above, the plurality of yarns may be manufactured to have any desired mesh pattern and the scrim may be oriented with respect to the nonwoven mat facer and panel core to have the desired relative orientation and position of the yarns. For example, the scrim may be configured such that the elongated yarns are substantially parallel with the panel edges or rotated up to 45 degrees to form nominally "diamond-shaped" scrim when viewed in the cross direction or the machine direction. As discussed above, the bundles of filaments may be adhered together so that the cross direction and machine direction form about 90 degree angles (or could be diamond in machine direction). That is, in certain embodiments, the substantially parallel elongated yarns are disposed approximately parallel to at least one edge of the roofing panel. In other embodiments, each set of approximately parallel elongated yarns is disposed at an angle of approximately 45 degrees, relative to at least one edge of the roofing panel.

The gypsum slurry may be provided in one or more layers, having the same or different compositions, including one or more slate coat layers. As discussed above, the gypsum core or a majority thereof may have a relatively high core density, of from about 45 lbs/ft$^3$ to about 80 lbs/ft$^3$, such as from about 48 lbs/ft$^3$ to about 68 lbs/ft$^3$, such as from about 52 lbs/ft$^3$ to about 63 lbs/ft$^3$. For example, core or core layer density can be controlled by adjusting foam and stucco addition rates during slurry mixing (e.g., heavier cores contain less foam and more stucco).

As used herein, the term "slate coat" refers to a gypsum slurry having a higher wet density than the remainder of the gypsum slurry that forms the gypsum core. These methods may be used to produce gypsum panels having any of the features, or combinations of features, described herein. Enhanced penetration of the gypsum into the scrim and/or fibrous mat may be achieved by chemical modification of the gypsum slurry, by application of a penetration-enhancing coating on the surface of the scrim and/or fibrous mat contacted by the gypsum slurry, and/or by mechanical means.

In certain embodiments, the gypsum core includes multiple layers that are sequentially applied to the scrim and mat facer, and allowed to set either sequentially or simultaneously. In other embodiments, the gypsum core includes a single layer. In some embodiments, a second nonwoven mat and/or scrim may be deposited onto a surface of the final gypsum slurry layer (or the sole gypsum slurry layer), to form a dual mat-faced gypsum panel, such as shown in FIG. 14. For example, the first and/or second mat facers may include an elastic/flexible coating on its surface that penetrates a portion of the mat. The gypsum slurry or multiple layers thereof may be deposited on the scrim and mat by any suitable means, such as roll coating.

In some embodiments, the gypsum core includes at least three gypsum layers, with the outermost gypsum layers of the gypsum core (i.e., the layers that form an interface with the fiberglass mats) being slate coat layers. In certain embodiments, both outermost layers are chemically altered for enhanced penetration.

In certain embodiments, the external surface of one or both of the nonwoven mat facers is coated with the elastic/flexible coating. In some embodiments, at least the mat facer that forms the facing side of the panel is coated. In some embodiments, the coating penetrates a portion of the mat, to define the remaining portion of the mat that gypsum crystals of the gypsum core penetrate, such that voids in the fiberglass mat are substantially eliminated. In certain embodiments, the elastic coating is applied and set or cured at ambient conditions. In other embodiments, the method includes a curing or drying step for the coating.

In certain embodiments, the first and/or second fibrous mats are already coated upon contacting the scrim and/or gypsum slurry. In some embodiments, the methods include applying the coating to the first and/or second fibrous mat, either before or after contacting the mats with the scrim and/or panel core slurry. In certain embodiments, applying the flexible/elastic coating includes spray coating, ribbon coating, curtain coating, knife coating, or direct roll coating. In some embodiments, the flexible/elastic coating is applied to each of the first and/or second fibrous mats in an amount forming a coating thickness of from about 1 mil to about 30 mils. For example, the elastic coating may be present in a weight of from about 10 lbs/msf to about 200 lbs/msf, such as from about 10 lbs/msf to about 165 lbs/msf, such as from about 25 lbs/msf to about 165 lbs/msf. It is envisioned that higher coating weights may also be used. In other embodiments, coated fibrous mats may be obtained in a pre-fabricated form.

In certain embodiments, the panel core slurry (or layers thereof) may be deposited on the non-coated side of a horizontally oriented moving web of scrim and pre-coated nonwoven fibrous mat. A second coated or uncoated fibrous mat may be deposited onto the surface of the panel core slurry opposite the scrim and first coated fibrous mat, e.g., a non-coated surface of the second coated fibrous mat contacts the panel core slurry. In some embodiments, a moving web of a scrim and pre-coated or uncoated nonwoven fibrous mat may be placed on the upper free surface of the aqueous panel core slurry. Thus, the panel core material may be sandwiched between two fibrous mats, one or both having a coating. In certain embodiments, allowing the panel core material and/or elastic/flexible coating to set includes curing, drying, such as in an oven or by another suitable drying mechanism, or allowing the material(s) to set at room temperature (i.e., to self-harden).

In certain embodiments, as shown in FIGS. 1 to 9, dry ingredients (not shown) from which the gypsum core is formed are pre-mixed and then fed to a mixer of the type commonly referred to as a pin mixer 2. Water and other liquid constituents (not shown) used in making the core are metered into the pin mixer 2 where they are combined with the dry ingredients to form an aqueous gypsum slurry. The slurry 4 is dispersed through one or more outlets at the bottom of the mixer 2 onto a moving sheet of pre-associated scrim 110 and fibrous mat 6. The sheet of scrim 110 and fibrous mat 6 may be indefinite in length and is fed from a roll (not shown). In certain embodiments, the two opposite edge portions of the scrim 110 and fibrous mat 6 are progressively flexed upwardly from the mean plane of the mat 6 and then turned inwardly at the margins so as to provide coverings for the edges of the resulting board 40. In FIG. 1, this progressive flexing and shaping of the edges are shown for only one side edge of the mat and the conventional guiding devices that are ordinarily employed for this purpose are omitted from the figure for the sake of clarity. FIG. 7 shows an edge of the set gypsum core 42 covered by the overlapped edge portion 6A of the mat 6. FIG. 7 shows optional score marks 10 and 10A of the mat 6, the score marks permitting the formation of good edges and flat surfaces. The score marks 10 and 10A are made by a conventional scoring wheel 12.

Another sheet of fibrous mat 16 may be fed from a roll (not shown) onto the top of slurry 4, thereby sandwiching the slurry between the two moving nonwoven fibrous mats that form the slurry. The mats 6 and 16 with the slurry 4 sandwiched therebetween enter the nip between the upper and lower forming or shaping rolls 18 and 20, and are thereafter received on a conveyer belt 22. Conventional edge guiding devices, such as indicated at 24, may shape and maintain the edges of the composite until the gypsum has set sufficiently to retain its shape. In due course, sequential lengths of the board are cut and optionally further processed by exposure to heat that accelerates the drying of the board by increasing the rate of evaporation of excess water in the gypsum slurry.

As discussed above, assemblies of the construction panels described herein, along with methods for their installation are also provided. For example, the assemblies may include any affixing of one or more construction panels on a surface thereof to a suitable substrate. For example, the assembly may be a roofing assembly (i.e., roof deck assembly) as described above.

For example, a method of installing a roofing panel may include securing the roofing panel to a roof deck assembly by adhering the adhesive on the surface of the roofing panel to the roof deck assembly. Particular roof assemblies and methods of installing roof assemblies are described above. It should be understood that while the panels, assemblies, and methods are described in certain instances herein with reference to a particular set of features, it is envisioned that the various features, details, and designs can be interchanged and substituted to derive various combinations not explicitly recited herein.

In certain embodiments, the construction panels are roof panels that are designed to be installed in a roof deck assembly, such as the traditional roof deck assemblies described herein and shown in FIGS. 10-12, 17, and 18. For example, the roofing panel may be adhered to or otherwise associated with any suitable substrate of the roof deck assembly, such as an insulation panel or roof deck. Specifically, the scrim-reinforced surface of the panel may form the "face" (i.e., the outward facing surface upon installation) of the panel and be installed such that the opposite surface contacts the deck or an insulation or other base layer of such an assembly. Such systems may provide any of various benefits as compared to traditional systems, including enhanced hail damage resistance. In other embodiments, the scrim-reinforced surface of the panel may form the "back" (i.e., the downward facing surface upon installation) of the panel and be installed to contact the deck or an insulation or other base layer of such an assembly. Such systems may provide any of various benefits as compared to traditional systems, including enhanced uplift resistance. As such, these panels may avoid the panel attachment being a weak link within the roof assembly. Thus, such panels may display improved assembly performance as well as increased energy savings.

Examples

Severe Weather/Hail Resistance

Experimental tests were conducted to assess the hail resistance properties of various construction panels according to the FM 4470 standards. For the FM Class 1-VSH testing, 2 in. (51 mm) diameter ice balls are propelled at the assembled roof test samples at a velocity of 152-160 f/s (46-49 m/s) using compressed air to achieve an impact energy of 53-58 ft-lb (72-79 J). Acceptance criteria to achieve a Class 1-VSH rating are to show no signs of cracking or splitting or separating or rupturing on the roof cover, the field seam and the substrate below the roof cover. Minor surface indentation in the substrate is allowed at the point of impact.

The metal missile impact testing method (MMIT) was also used as a proxy for tests in FM 4470 and 4471. To simulate a Class 1-VSH test, 10 lb metal missile with 2 in. diameter steel ball head is dropped from height of 5.3 ft onto the test sample to generate an impact energy of approximately 53 ft-lb over the impact area. The surface indentation depth at the point of impact is measured to evaluate the impact resistant performance after 10lb MMIT testing. Because 10lb MMIT shows a strong correlation to the FM 4470 Class 1-VSH ice ball testing results, 10 lb MMIT was used to evaluate 1-VSH performance.

Figure 19:
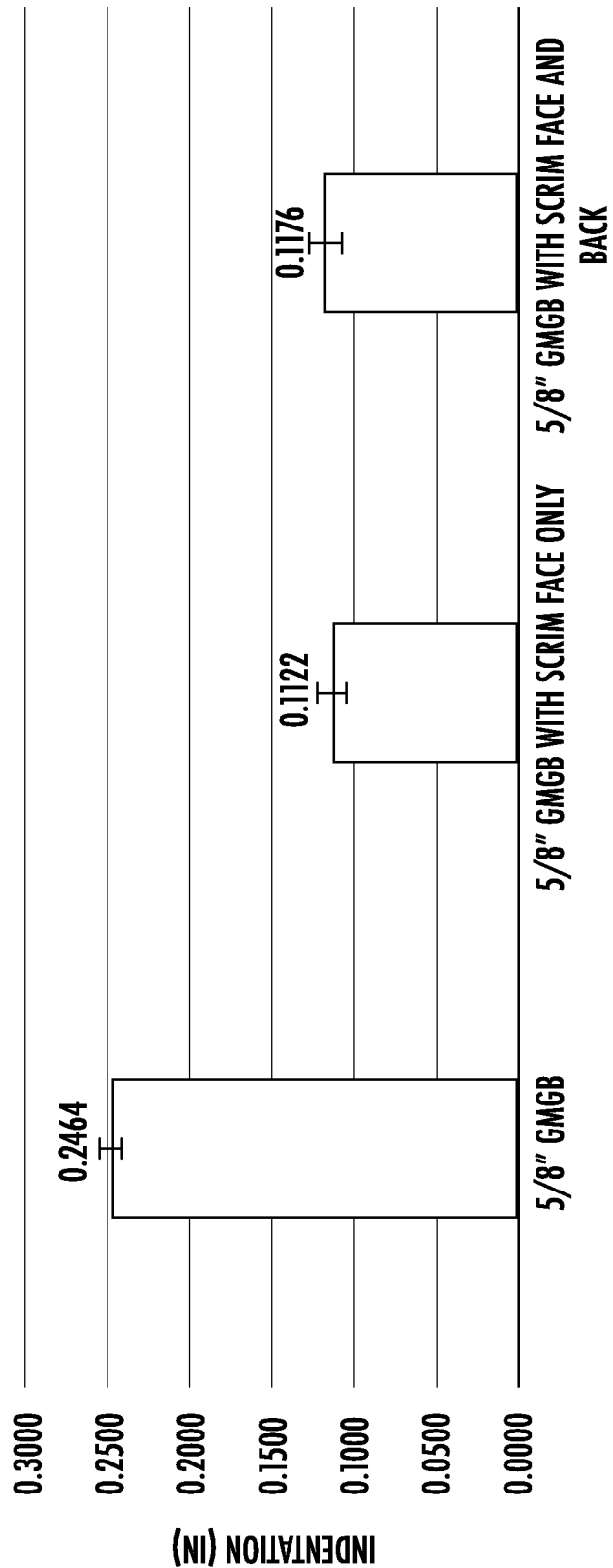
FIG. 19 is a graph showing the results of an indentation test described in the Examples.

First, embedded scrims were tested and discovered to significantly increase the impact resistance of a construction panel according to the FM 4470 testing. In particular, a fiberglass scrim was observed to significantly increase the impact resistance when a fiberglass scrim was embedded in the gypsum board core close to the facing mat. FIG. 19 illustrates that a fiberglass scrim embedded ⅝" glass mat gypsum board (GMGB) can reduce more than 50% of the surface indentation compared to an identical board without the embedded scrim after 10lb MMIT testing. However, surface cracking was observed in these test panels. Surface cracking was rated on a 0-10 scale with 0 being substrate surface showing no cracks and 10 being surface substrate showing multiple cracks, ½" or longer. All substrates tested in FIG. 19 resulted in a crack grade of 10, indicating severe cracks.

Figure 20:
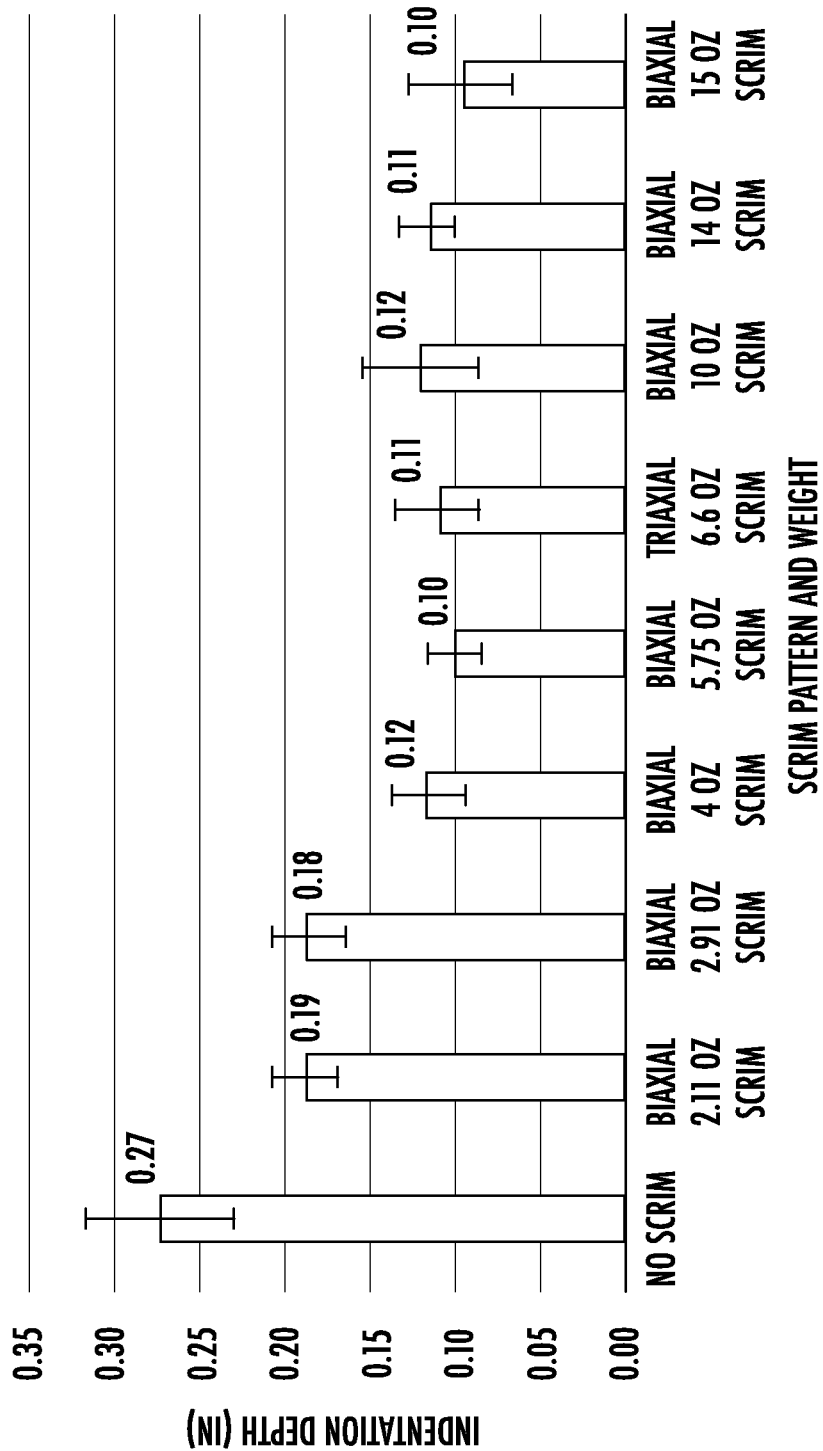
FIG. 20 is a graph showing the results of an indentation test described in the Examples.

The effects of different scrim patterns and weights also were evaluated. In particular, scrims were embedded to the face of ⅝" boards with a target density of 45-80 lbs/ft$^3$. Two scrims patterns were evaluated: biaxial (di-directional) and triaxial (tri-directional). The results are shown in FIG. 20, which indicates that scrims with a weight higher than 4 oz/yd$^2$ embedded to face are most effective at reducing indentation depth of ⅝" GMGB.

Figure 29:
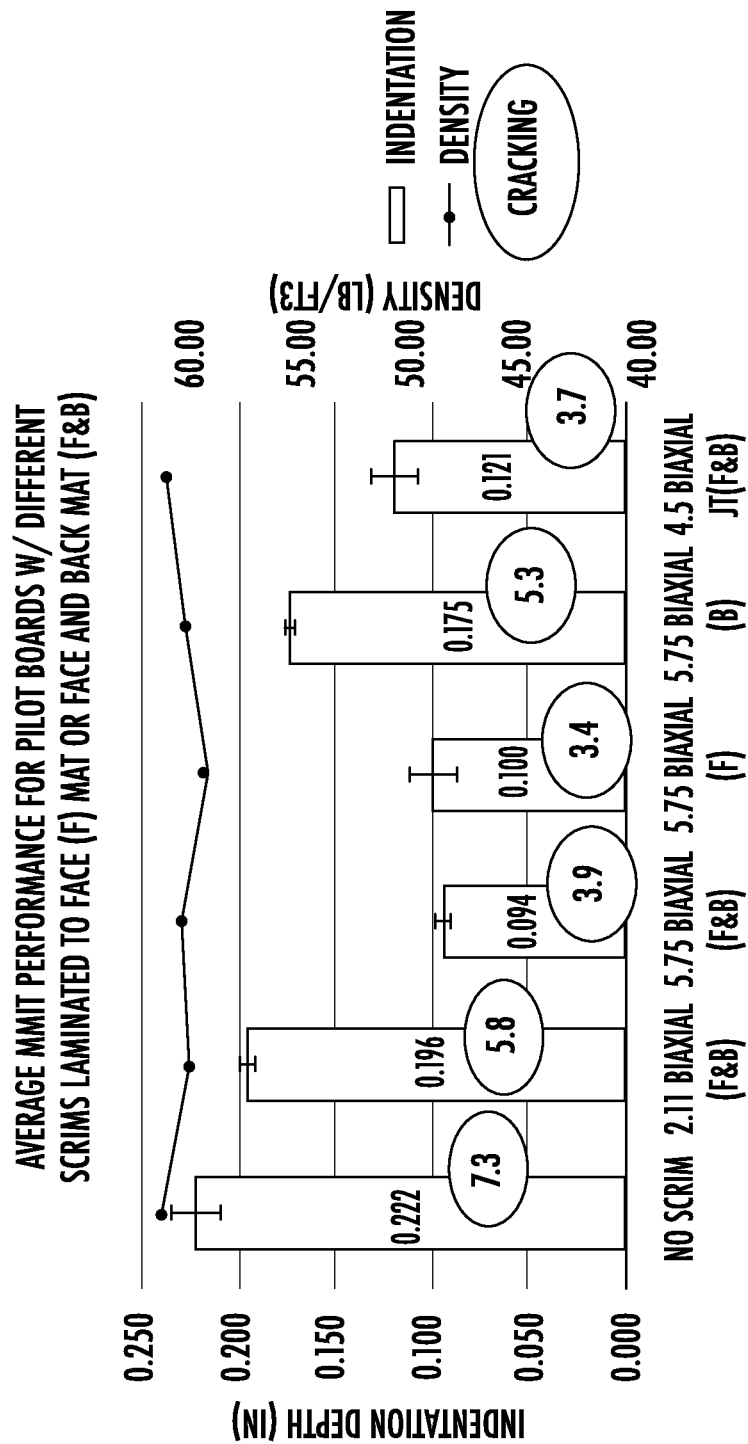
FIG. 29 is a graph showing the results of an indentation test described in the Examples.
Figure 30:
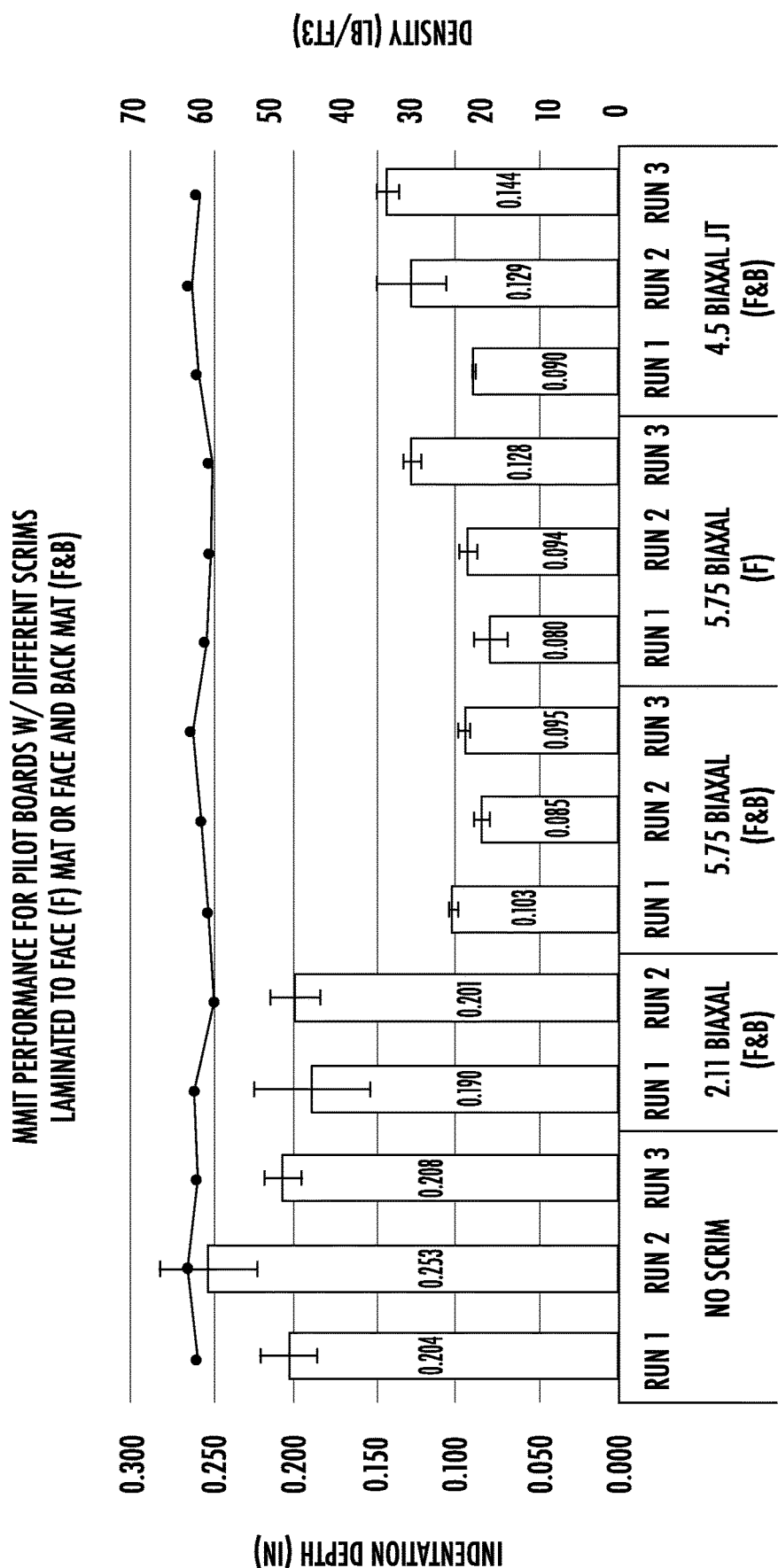
FIG. 30 is a graph showing the results of an indentation test described in the Examples.

Additionally, the effect of the scrim placement within the board was evaluated. In particular, different fiberglass scrim constructions were laminated at different positions in a GMGB—face (F), back (B), or face and back (F&B)—and subjected to the MMIT test. The scrim constructions included a lightweight biaxial scrim (2.11 oz/yd$^2$), a 5.75 oz/yd$^2$ biaxial scrim, and a 4.5 oz/yd$^2$ biaxial joint tape (JT) scrim. The results are shown in FIGS. 29 and 30, which confirmed that having a scrim laminated to the face mat drives the impact resistance performance of the board. The lightweight scrim laminated to the face and back slightly reduced indentation depth and cracking relative to no scrim, while the 5.75 biaxial scrim laminated to the face and back did not show significant indentation or cracking. It was surprisingly discovered that placement of a scrim on the back reduces impact depth on the opposed face side, while having a scrim laminated to the back mat also reduced back mat cracking.

Figure 31:
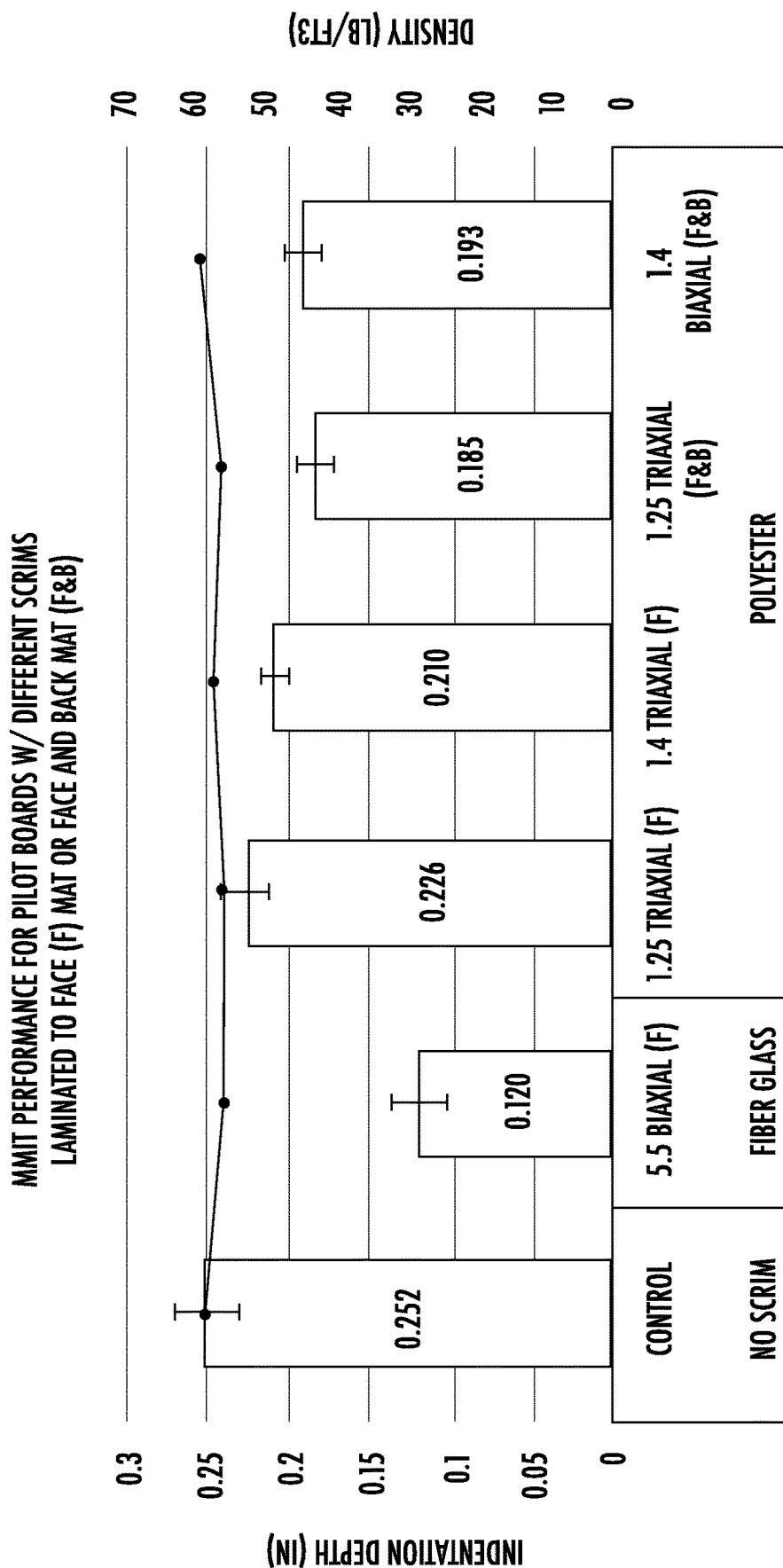
FIG. 31 is a graph showing the results of an indentation test described in the Examples.

In another evaluation of the scrim placement, two polyester scrims and one fiberglass scrim were tested in a GMGB, including a 5.5 oz/yd$^2$ biaxial fiberglass scrim, a 1.25 oz/yd$^2$ triaxial polyester scrim, and a 1.4 oz/yd$^2$ biaxial polyester scrim. The results are shown in FIG. 31, which revealed that even the lightweight polyester scrims laminated to the face and back slightly reduced indentation depth and cracking relative to no scrim, although the glass scrims above 4 oz/yd$^2$ outperformed the other scrims. Again, it was discovered that having a scrim on the back reduces impact depth on face, while having a scrim laminated to the back mat slightly reduced back mat cracking.

Figure 32:
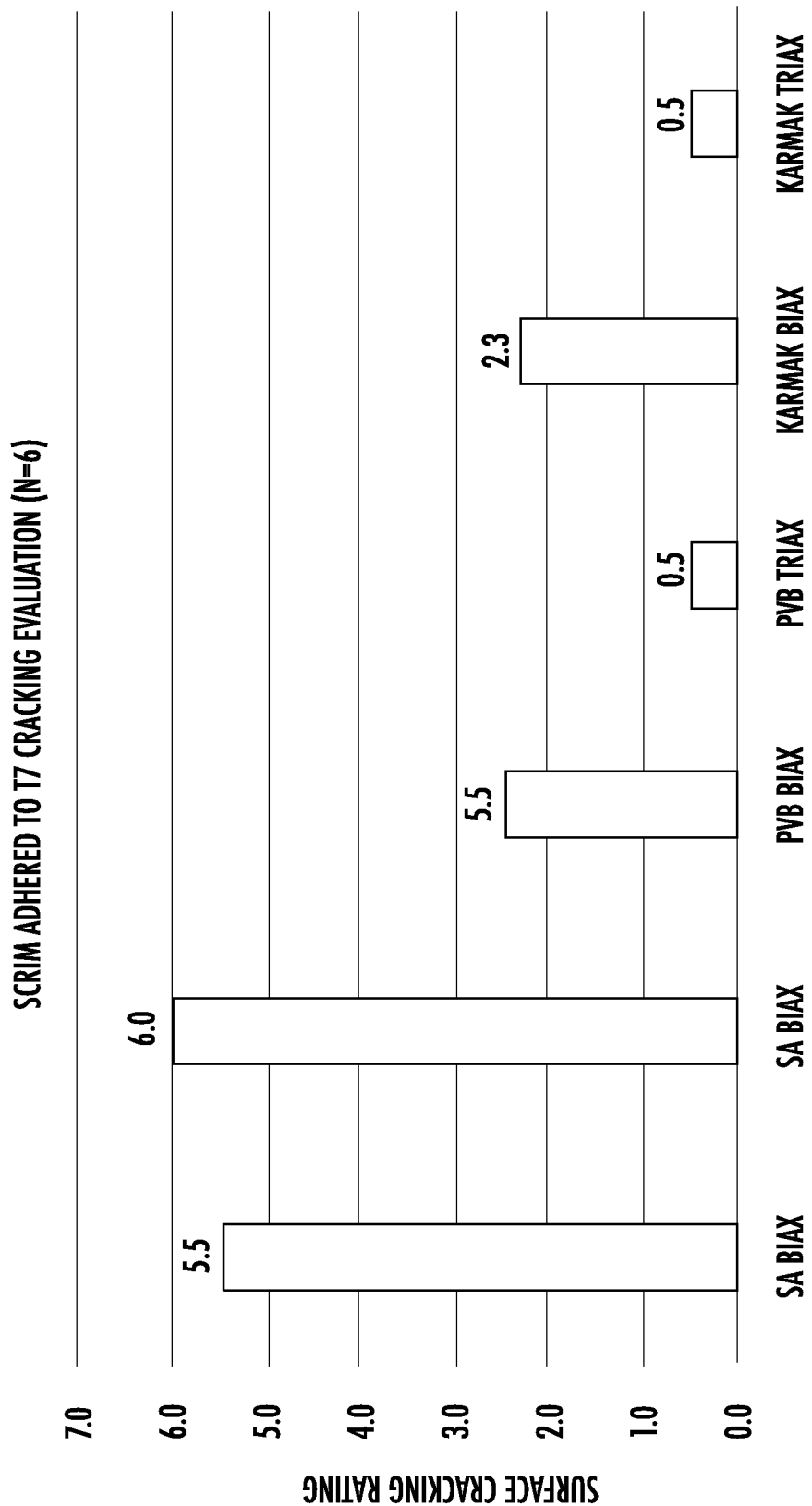
FIG. 32 is a graph showing the results of a cracking test described in the Examples.

In yet another evaluation of scrim placement, biaxial and triaxial scrims were adhered to the external surface of the face mat of GMGB and tested for impact resistance. The externally adhered scrims were adhered to the board with a spray adhesive or an elastomeric coating (Karnak 528, commercially available from Karnak Corp., New Jersey, or Polyvinyl Butyral (PVB)) applied at 165 pounds/msf. The results are shown at FIG. 32, which illustrate that cracking is drastically reduced by coating adhered scrim versus no scrim, and potentially superior to the scrim on top of the board with no coating. Further elastomeric coating tests are described below. Additionally, the triaxial scrim outperformed the biaxial scrim boards in this test.

Various commercially available fiberglass scrims were evaluated to assess the properties that may contribute to the enhanced indentation resistance. Measured properties include the VSH MMIT indentation when laminated within a GMGB, yarn width, thickness, yarn spacing in the machine direction (MD), yarn spacing in the cross direction (CD), area, and yarn count (EPI) in both the machine and cross directions. The results are shown in Tables 1 and 2 below. As can be seen, commercial scrims of the same weight obtained from different lots of the same product line or from different vendors varied in their effectiveness at indentation and cracking resistance, which may be due to differences in the measured structural properties of the scrims. Further, it can be seen that the scrim weight and pattern alone do not dictate the effectiveness of the scrim at enhancing indentation resistance.

TABLE 1

Scrim Properties Comparison

| Scrim Weight (oz/yd$^2$) | Pattern | MMIT Indentation (in) | Yarn Widths | Thickness | Yarn Spacing MD | Yarn Spacing CD | Area (in$^2$) | EPI MD | EPI CD |
|---|---|---|---|---|---|---|---|---|---|
| 15 | Biaxial | 0.095 | 0.108 | 0.391 | 0.150 | 0.117 | 0.0176 | 5.0 | 5.0 |
| 5.75 (First lot) | Biaxial | 0.082 | 0.067 | 0.020 | 0.344 | 0.140 | 0.0481 | 4.0 | 8.0 |
| 5.75 (Second lot) | Biaxial | 0.085 | 0.086 | 0.022 | 0.413 | 0.218 | 0.0899 | 4.0 | 6.0 |
| 5.75 (Third lot) | Biaxial | 0.090 | 0.073 | 0.021 | 0.334 | 0.337 | 0.1126 | 3.7 | 6.0 |
| 7 | Biaxial | 0.150 | 0.127 | 0.019 | 0.673 | 0.433 | 0.2909 | 2.3 | 2.0 |
| 4 | Biaxial | 0.112 | 0.050 | 0.012 | 0.129 | 0.129 | 0.0166 | 6.0 | 6.0 |
| 14 | Biaxial | 0.109 | 0.124 | 0.025 | 0.280 | 0.236 | 0.0660 | 3.0 | 3.3 |
| 20 | Biaxial | — | 0.132 | 0.057 | 0.194 | 0.165 | 0.0320 | 3.3 | 4.3 |

TABLE 2

Scrim Properties Comparison

| Scrim Weight (oz/yd$^2$)/Pattern | VSH MMIT Indentation (in) | VSH MMIT Cracking (out of 10) |
|---|---|---|
| Vendor 1 4 oz Biaxial | 0.113 | 8.5 |
| Vendor 1 10 oz Biaxial | 0.107 | 8.5 |
| Vendor 1 4 oz Biaxial | 0.109 | 8.8 |
| Vendor 2 2.11 oz Biaxial | 0.203 | 9.8 |
| Vendor 2 2.91 oz Biaxial | 0.173 | 8.8 |
| Vendor 2 5.75 oz Biaxial | 0.106 | 7.0 |
| Vendor 2 6.6 oz Triaxial | 0.120 | 4.3 |
| Vendor 3 7 oz Biaxial | 0.150 | 8.2 |
| Vendor 4 4 oz Biaxial | 0.122 | 4.7 |
| Vendor 4 15 oz Biaxial | 0.095 | 7.0 |
| Control 1 (No scrim) | 0.257 | 10.0 |
| Control 2 (no scrim) | 0.252 | 9.5 |

Figure 21:
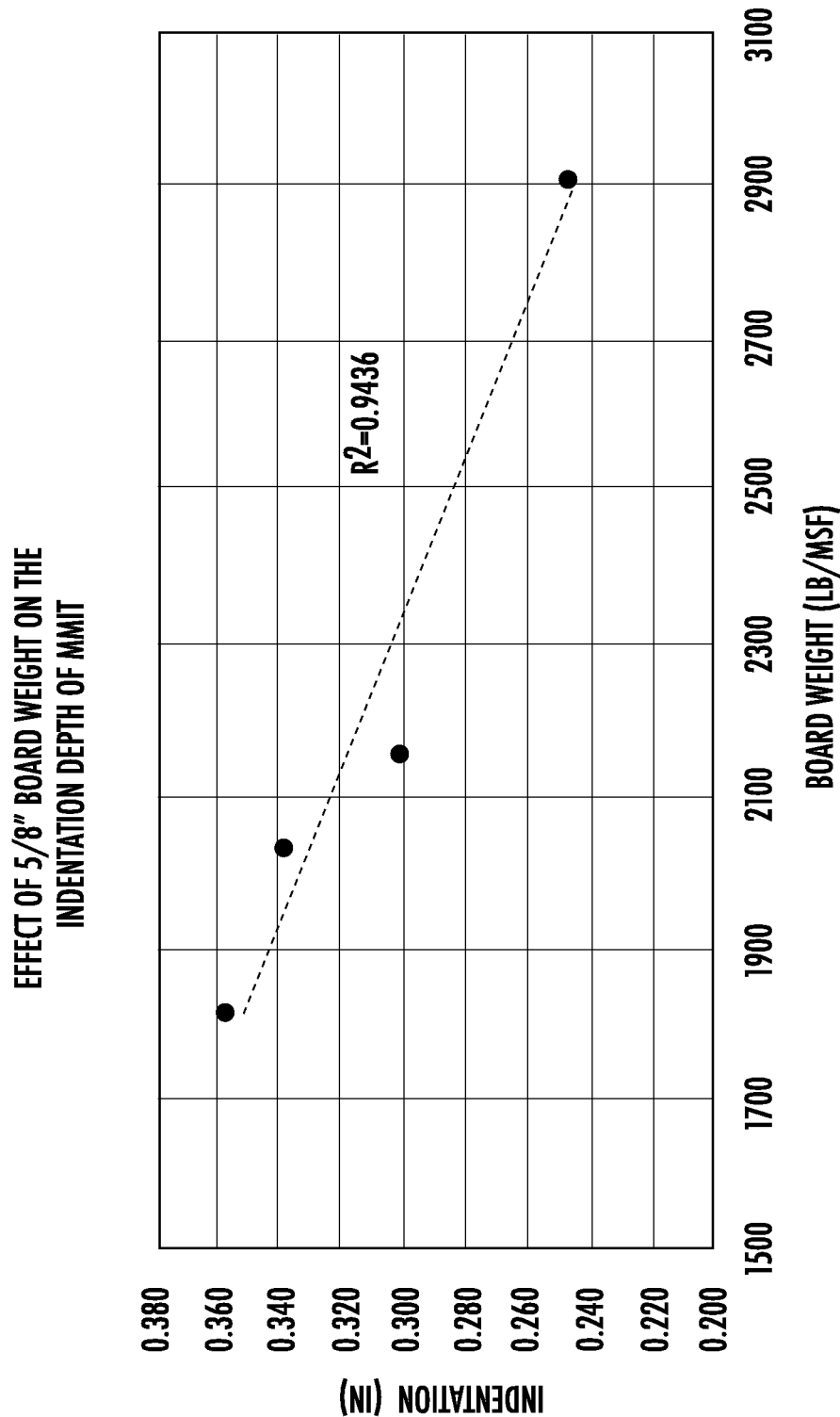
FIG. 21 is a graph showing the results of an indentation test described in the Examples.

Tests were also conducted to observe the performance of panels having varied core densities. As is illustrated by FIG. 21, a good correlation ($R^2$=0.9436) between board weight and impact indentation was observed. The heavier board at the same thickness show better impact indentation resistance, but surface cracks occurred after 10lb MMIT testing. FIG. 21 shows the effect of ⅝" no scrim GMGB board weight versus indentation depth (in). For this ⅝" GMGB, a 3200 lbs/msf board weight translates to a board density of approximately 60 lbs/ft$^3$. Thus, it was discovered that although increased board density leads to improved impact indentation resistance, these high-density boards were susceptible to cracking.

Figure 22:
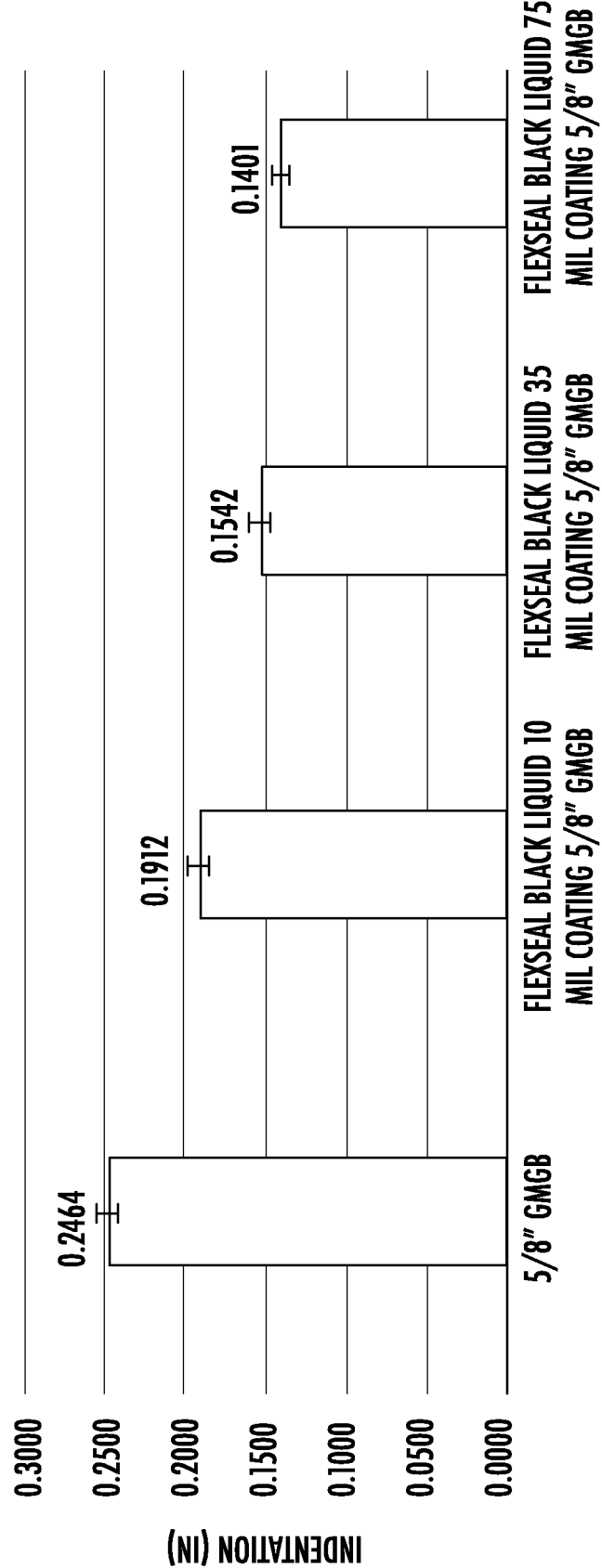
FIG. 22 is a graph showing the results of an indentation test described in the Examples.

Next, various panel coatings were tested and it was discovered that a rubberized or elastomeric coating applied to the surface of the panel will enhance the surface crack resistance, indentation resistance, and water resistance of the gypsum board. For example, as shown in FIG. 22, a Flex Seal® Black Liquid (commercially available from Flex Seal Products, California) coated ⅝" GMGB without embedded scrim was found to decrease 37% of indentation at 35 mil thickness. No surface cracking of the cured Flex Seal film was observed at 35 mil and 75 mil thickness, but deep indentation occurred after 10lb MMIT testing.

Figure 23:
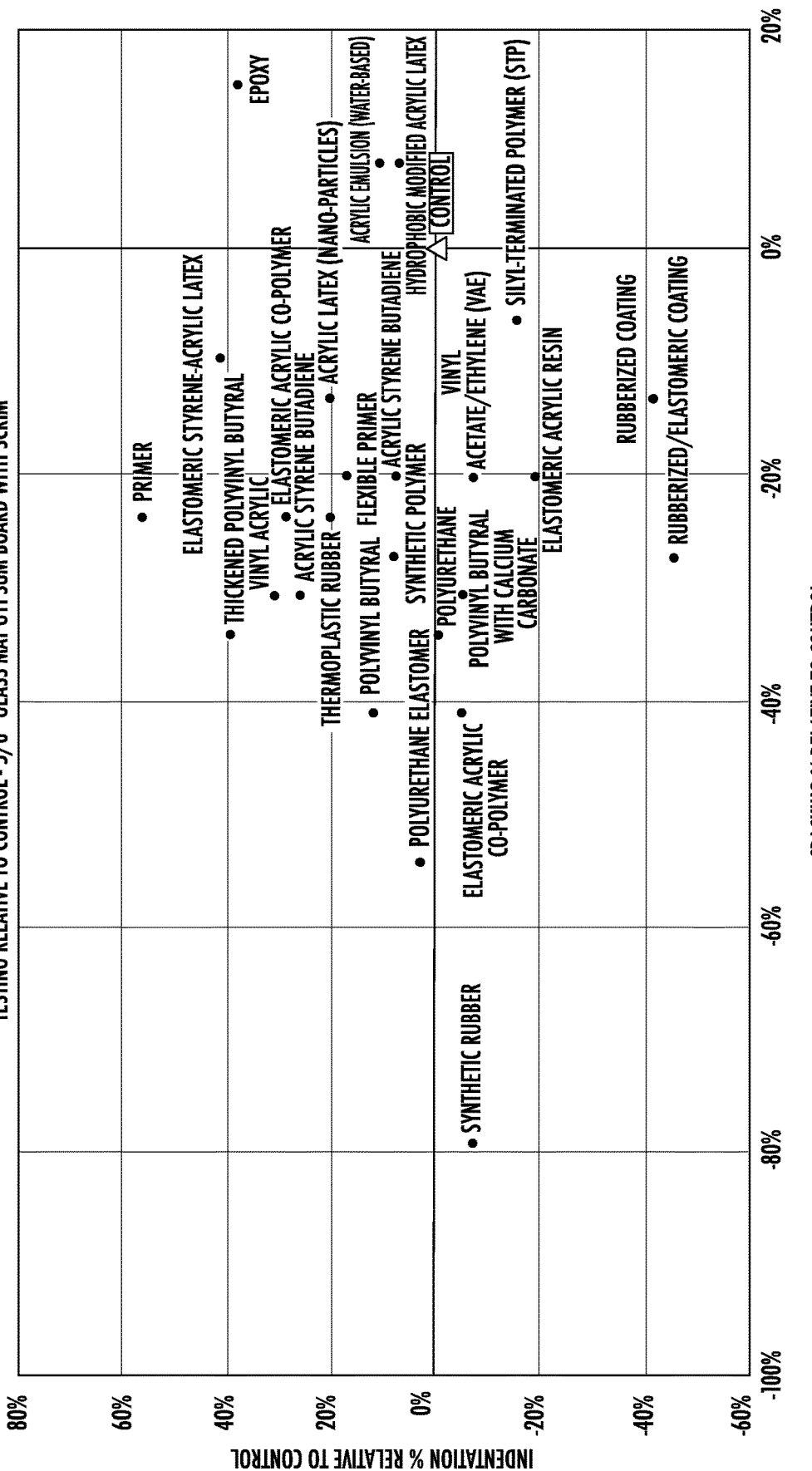
FIG. 23 is a graph showing the results of an indentation test described in the Examples.

Next, multiple coatings were evaluated at two different loadings (coating thicknesses) for their effectiveness to reduce MMIT indentation depth and visual cracking. Control GMGB is ⅝" with 6.6 oz/yd$^2$ triaxial scrim embedded to the face of the board and core density of ~59 lbs/ft$^3$. The results of these tests are shown in FIG. 23, which shows the landscape of different types of coatings applied at 27.5 lbs/msf loading (~3-5 mils thickness). The control run, depicted by the red triangle, represents VSH MMIT—indentation and crack score—obtained from gypsum board with scrim and no coating—center point. Indentation is measured (inches) while cracking is graded on a scale from 0 to 10 with 0 indicating no cracks and 10 indicating major cracks to substrate surface. A decrease in % cracking or indentation represents an improvement in MMIT performance. The upper left quadrant and lower left quadrant represent the regions of interest for the VSH application with the lower left quadrant coatings deemed the most promising. Of note, certain common chemstries used in other gypsum panel coating applications were deemed ineffective at improving hail resistance properties, including certain water-based coating materials.

Figure 24:
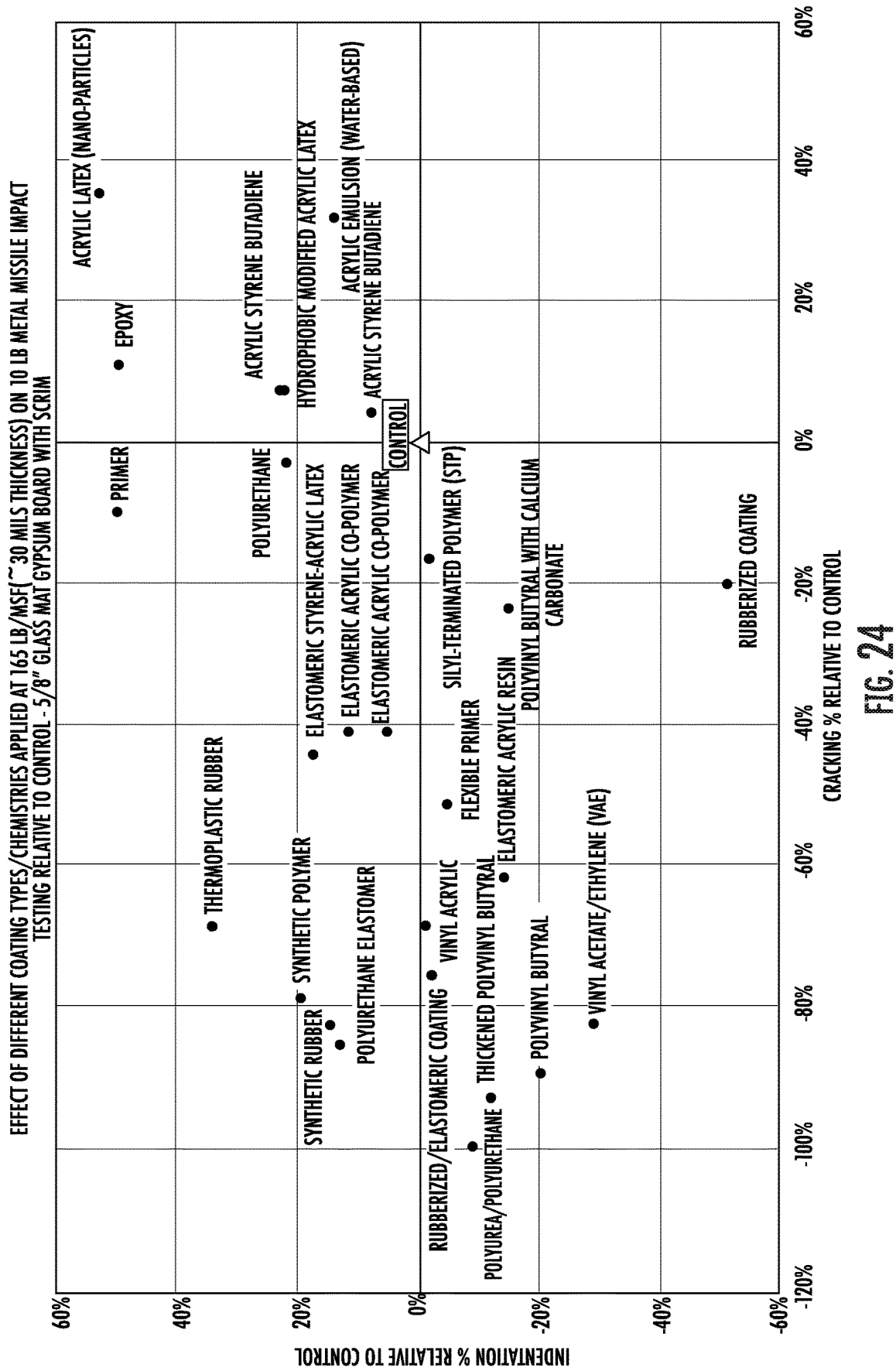
FIG. 24 is a graph showing the results of an indentation test described in the Examples.

FIG. 24 shows a second landscape analysis of different types of coatings applied at 165 lbs/msf loading (~30 mils thickness). The control run, depicted by the red triangle, represents VSH MMIT—indentation and crack score—measured on gypsum board with scrim and no coating—center point. A decrease in % cracking or indentation (negative value) represents an improvement in VSH MMIT performance. Conversely, any increase in % (positive value) represents an undesirable effect on performance. The lower left quadrant was observed to include the most promising types of coatings tested.

In order to further analyze these findings, Table 3 below exhibits the class of chemistry of each coating, name of product(s) tested that falls under specific class, and loading(s) at which coatings were applied to gypsum board, respectively for those materials of the lower left quadrant. For example, the first coatings class in Table 3 is an Elastomeric Acrylic co-polymer and is highlighted in orange. A product that fits this chemical class, Karnak 529 Renu-white (commercially available from Karnak Corp., New Jersey), was evaluated at 27.5 lbs/msf loading applied to gypsum board. Accordingly, the average indentation and cracking relative to control were −5% and −41%, respectively. Therefore, indentation was reduced by 5% and cracking was reduced by 41% compared to control substrate with no coating. Table 3 also indicates the range of loadings used per product/chemistry class of coatings that achieved performance, i.e., minor indentation and cracking of substrate.

TABLE 3

MMIT results - types of coatings tested along with their respective product name and loadings

| Chemistries/Products/Loading that helped in reducing indentation and cracking relative to control | Average of Indentation Delta from Control (%) | Average of Cracking Delta from Control (%) |
|---|---|---|
| Elastomeric Acrylic co-polymer | −5% | −41% |
| Karnak 529 Renu-white (commercially available from Karnak Corp., New Jersey) | −5% | −41% |
| 27.5#/msf | −5% | −41% |
| Elastomeric Acrylic resin | −16% | −41% |
| Karnak 535 QS Enviro-Lastic (commercially available from Karnak Corp., New Jersey) | −16% | −41% |
| 165#/msf | −14% | −62% |
| 27.5#/msf | −19% | −20% |
| Emulsion of plasticized Polyvinyl Butyral | −20% | −90% |
| PVB Shark Dispersion PC100W (commercially available from Shark Solutions ApS, Denmark) | −20% | −90% |
| 165#/msf | −20% | −90% |
| Emulsion of plasticized Polyvinyl Butyral with Calcium Carbonate | −10% | −27% |
| Shark PC-01 (commercially available from Shark Solutions ApS, Denmark) | −10% | −27% |
| 165#/msf | −15% | −24% |
| 27.5#/msf | −5% | −31% |
| Flexible Primer | −5% | −51% |
| Axalta Flexible Primer (commercially available from Axalta Coating Systems, Pennsylvania) | −5% | −51% |
| 165#/msf | −5% | −51% |
| Polyurea/polyurethane | −9% | −100% |
| Line-X XS-100 (commercially available from Line-X LLC, Alabama) | −9% | −100% |
| 165#/msf | −9% | −100% |
| Polyurethane | −1% | −34% |
| Nanomyte Mend 2000 (commercially available from NEI Corp., New Jersey) | −1% | −34% |
| 27.5#/msf | −1% | −34% |
| Primer | −4% | −31% |
| Axalta DS Incumbent Primer (commercially available from Axalta Coating Systems, Pennsylvania) | −4% | −31% |
| 27.5#/msf | −4% | −31% |
| rubberized coating | −46% | −17% |
| Prosoco Fast Flash (commercially available from Prosoco, Kansas) | −46% | −17% |
| 165#/msf | −51% | −20% |
| 27.5#/msf | −41% | −13% |
| Rubberized/elastomeric coating | −24% | −51% |
| Flex Seal Clear Liquid (commercially available from Flex Seal Products, California) | −24% | −51% |
| 165#/msf | −2% | −76% |
| 27.5#/msf | −45% | −27% |
| silyl-terminated polymer (STP) | −9% | −11% |
| Prosoco R-Guard Cat5 (commercially available from Prosoco, Kansas) | −9% | −11% |
| 165#/msf | −2% | −17% |
| 27.5#/msf | −15% | −6% |
| Synthetic rubber | −7% | −79% |
| EPDM X-23 Low VOC Bonding Adhesive (Carlisle) | −7% | −79% |
| (commercially available from Carlisle Syntec Systems, Pennsylvania) | | |
| 27.5#/msf | −7% | −79% |
| Thickened Polyvinyl Butyral | −12% | −93% |
| Shark PC-02 (commercially available from Shark Solutions ApS, Denmark) | −12% | −93% |
| 165#/msf | −12% | −93% |
| vinyl acetate/ethylene (VAE) | −18% | −51% |
| Arkema Encor 282 (commercially available from Arkema S.A., France) | −18% | −51% |
| 165#/msf | −29% | −83% |
| 27.5#/msf | −7% | −20% |
| Vinyl Acrylic | −1% | −69% |
| Arkema Encor 310 (commercially available from Arkema S.A., France) | −1% | −69% |
| 165#/msf | −1% | −69% |

Additionally, Table 4 below represents results from the upper left quadrant in FIGS. 23 and 24. Coatings that fall into this quadrant were observed to provide a reduction in cracking of the substrate but not indentation of gypsum board.

TABLE 4

MMIT results - types of coatings tested along with their respective product name and loadings

| Chemistries/Products/Loading that helped in reducing cracking only relative to control | Average of Indentation Delta from Control (%) | Average of Cracking Delta from Control (%) |
|---|---|---|
| Acrylic | 21% | −13% |
| Arkema Snap 720 (commercially available from Arkema S.A., France) | 21% | −13% |
| 27.5#/msf | 21% | −13% |
| acrylic styrene butadiene | 17% | −25% |
| Arkema Encor DL 313 (commercially available from Arkema S.A., France) | 26% | −31% |
| 27.5#/msf | 26% | −31% |
| Omnova Genceal 8100 (commercially available from Omnova Solutions, Inc., Ohio) | 8% | −20% |
| 27.5#/msf | 8% | −20% |
| Elastomeric Acrylic co-polymer | 15% | −35% |
| Karnak 501 Elasto-Brite (commercially available from Karnak Corp., New Jersey) | 17% | −32% |
| 165#/msf | 5% | −41% |
| 27.5#/msf | 29% | −24% |
| Karnak 529 Renu-white (commercially available from Karnak Corp., New Jersey) | 12% | −41% |

TABLE 4-continued

MMIT results - types of coatings tested along with their respective product name and loadings

| Chemistries/Products/Loading that helped in reducing cracking only relative to control | Average of Indentation Delta from Control (%) | Average of Cracking Delta from Control (%) |
|---|---|---|
| 165#/msf | 12% | −41% |
| elastomeric styrene-acrylic latex | 30% | −27% |
| Arkema Encor 123 (commercially available from Arkema S.A., France) | 30% | −27% |
| 165#/msf | 18% | −44% |
| 27.5#/msf | 42% | −10% |
| Emulsion of plasticized Polyvinyl Butyral | 12% | −41% |
| PVB Shark Dispersion PC100W (commercially available from Shark Solutions ApS, Denmark) | 12% | −41% |
| 27.5#/msf | 12% | −41% |
| Flexible Primer | 40% | −17% |
| AkzoNobel Flexible Primer (commercially available from AkzoNobel, Denmark) | 52% | −15% |
| 165#/msf | 47% | −6% |
| 27.5#/msf | 56% | −24% |
| Axalta Flexible Primer (commercially available from Axalta Coating Systems, Pennsylvania) | 17% | −20% |
| 27.5#/msf | 17% | −20% |
| Polyurea/polyurethane | 19% | −69% |
| Line-X XS-100 (commercially available from Line-X LLC, Alabama) | 19% | −69% |
| 80#/msf | 19% | −69% |
| Polyurethane | 22% | −3% |
| Nanomyte Mend 2000 (commercially available from NEI Corp., New Jersey) | 22% | −3% |
| 165#/msf | 22% | −3% |
| Polyurethane Elastomer | 8% | −70% |
| Smooth-On UreCoat ® (commercially available from Smooth-On, Inc., Pennsylvania) | 8% | −70% |
| 165#/msf | 13% | −85% |
| 27.5#/msf | 3% | −54% |
| Primer | 44% | −19% |
| AkzoNobel DS Incumbent Primer (commercially available from AkzoNobel, Denmark) | 30% | −22% |
| 165#/msf | 50% | −10% |
| 27.5#/msf | 11% | −34% |
| Axalta DS Incumbent Primer (commercially available from Axalta Coating Systems, Pennsylvania) | 70% | −13% |
| 165#/msf | 70% | −13% |
| Synthetic polymer | 14% | −53% |
| JM Membrane Bonding Adhesive (Solvent-based) (commercially available from Johns Manville, Colorado) | 14% | −53% |
| 165#/msf | 20% | −79% |
| 27.5#/msf | 8% | −27% |
| Synthetic rubber | 15% | −83% |
| EPDM X-23 Low VOC Bonding Adhesive (Carlisle) (commercially available from Carlisle Syntec Systems, Pennsylvania) | 15% | −83% |
| 165#/msf | 15% | −83% |
| Thermoplastic rubber | 27% | −46% |
| Karnak 502 Elasto-Kote White (commercially available from Karnak Corp., New Jersey) | 27% | −46% |
| 165#/msf | 35% | −69% |
| 27.5#/msf | 20% | −24% |
| Thickened Polyvinyl Butyral | 39% | −34% |
| Shark PC-02 (commercially available from Shark Solutions ApS, Denmark) | 39% | −34% |
| 27.5#/msf | 39% | −34% |
| Vinyl Acrylic | 31% | −31% |
| Arkema Encor 310 (commercially available from Arkema S.A., France) | 31% | −31% |
| 27.5#/msf | 31% | −31% |

Figure 25:
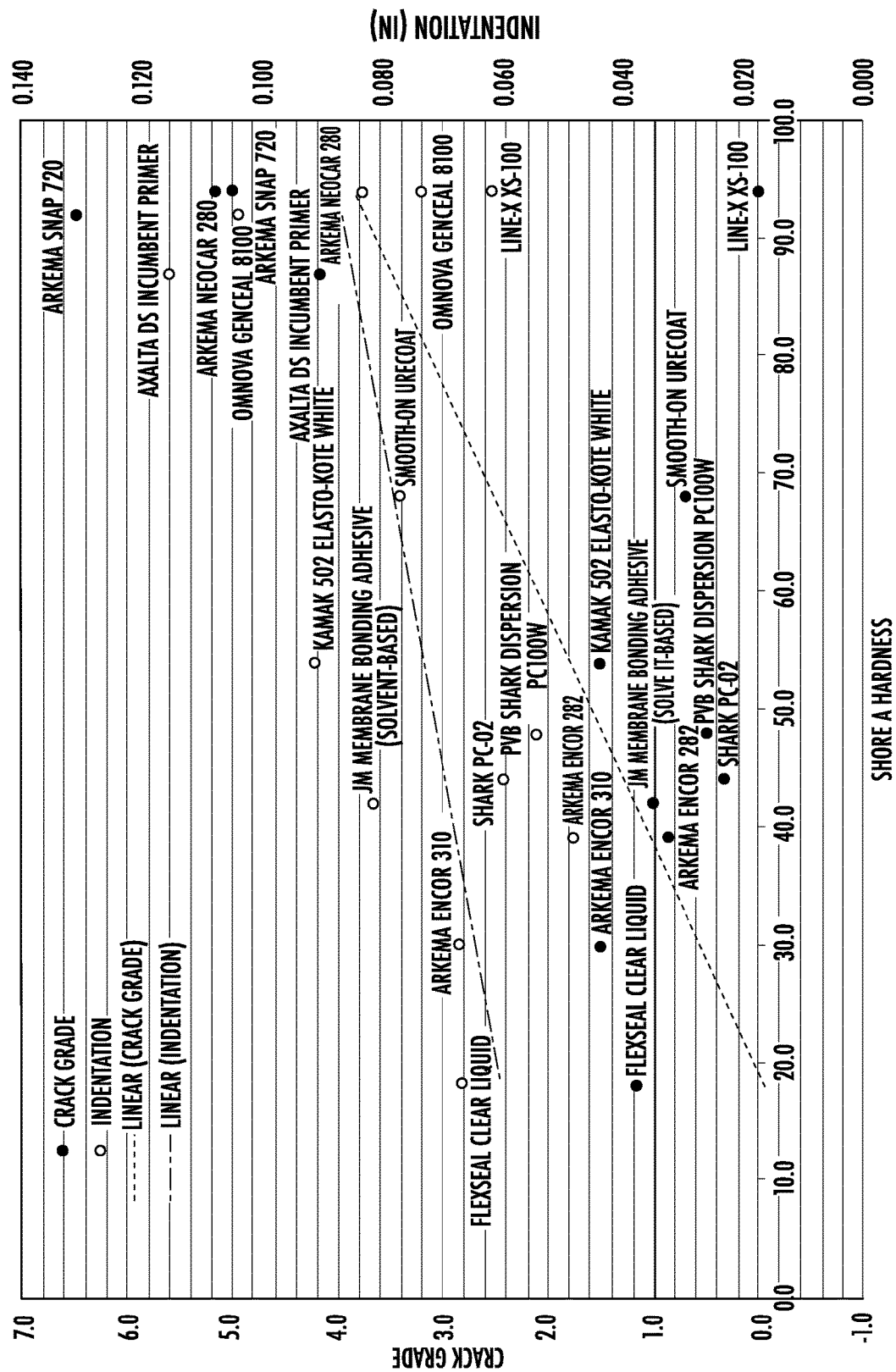
FIG. 25 is a graph showing the results of an indentation test described in the Examples.

Additionally, the Shore hardness of each coating material was discovered to significantly correlate with the crack grade (R-squared=0.67) and indentation (R-squared=0.54). FIG. 25 shows the effect of different products with different Shore A hardness on crack grade and indentation of the gypsum board. With the exception of a polyurea/polyurethane hybrid product, products with Shore rating between 18A and 75A have shown significant reduction in cracking and indentation. Note that the acceptable crack grade is <4.8 and indentation <0.068 in (highlighted in FIG. 25).

Thus, based on the foregoing analyses of various coating materials, Table 5 shows the coating materials that displayed superior performance when applied as described to form the surface coating of a construction panel. The properties of each coating material are summarized in Table 5 below.

TABLE 5

Coating material properties summary

| Product Name | Type | Flash Point (F.) | BP (F.) | Relative Density | Solubility in water | Solids w % | Viscosity (cps) | pH | Tg (F.) | Shore Hardness |
|---|---|---|---|---|---|---|---|---|---|---|
| PVB Shark Dispersion PC100W | Emulsion of plasticized Polyvinyl Butyral | NA | | 1.03 | mixable before drying | 45-48 | <600 | 9 | | 48A |

TABLE 5-continued

Coating material properties summary

| Product Name | Type | Flash Point (F.) | BP (F.) | Relative Density | Solubility in water | Solids w % | Viscosity (cps) | pH | Tg (F.) | Shore Hardness |
|---|---|---|---|---|---|---|---|---|---|---|
| Flex Seal Clear Liquid | Rubberized/elastomeric coating | 128 | | 1 | | | | | | 18A |
| Axalta Flexible Primer | Flexible Primer | 230 | | | | 77.2 | 13000 | 9 | | 58A |
| EPDM X-23 Low VOC Bonding Adhesive (Carlisle) | Synthetic rubber | 0 | | | | 21.1 | 3100 | | | |
| JM Membrane Bonding Adhesive (Solvent-based) | Synthetic polymer | | | 0.86 | | | 900-4000 | | | 42A |
| Shark PC-02 | Emulsion of plasticized Polyvinyl Butyral | NA | | | | | 8800 | | | 44A |
| Karnak 502 Elasto-Kote White | Thermoplastic rubber | >107 | 300 | 1.1 | insoluble | 50 | | | | 55A |
| Karnak 501 Elasto-Brite | Acrylic polymer | NA | 212 | 1.3 | soluble | 59 | | | | 70A |
| Karnak 529 Renu-white | Acrylic polymer | NA | 212 | 1.3 | soluble | 63 | | | | |
| Karnak 535 QS Enviro-Lastic | Acrylic resin | | | | | 66 | | | | 75A |
| Arkema Encor 123 | elastomeric styrene-acrylic latex | | 212 | 1.02 | miscible | 60 | 150 | 8.5 | 1 | 13A |
| Arkema Encor 282 | vinyl acetate/ ethylene (VAE) | | | | | 56 | 500 | 5 | 52 | 39A |
| Arkema Encor 310 | Vinyl Acrylic | | | | | 55 | 200 | 5 | 45 | 30A |
| Smooth-on UreCoat | Polyurethane elastomer | >270 | | 1.05 | not soluble | | 3800 | | | 68A |
| Line-X XS 100 | Polyurea/ polyurethane | | | | | | | | | 45D |

Additionally, it was observed that many of the suitable coating materials, when applied to a panel without an embedded filamentous scrim, displayed delamination of the coating material under test conditions. However, these particular coatings in combination with the embedded scrim at the facing side of the panel surprisingly performed significantly better than panels with either feature in isolation.

Figure 26:
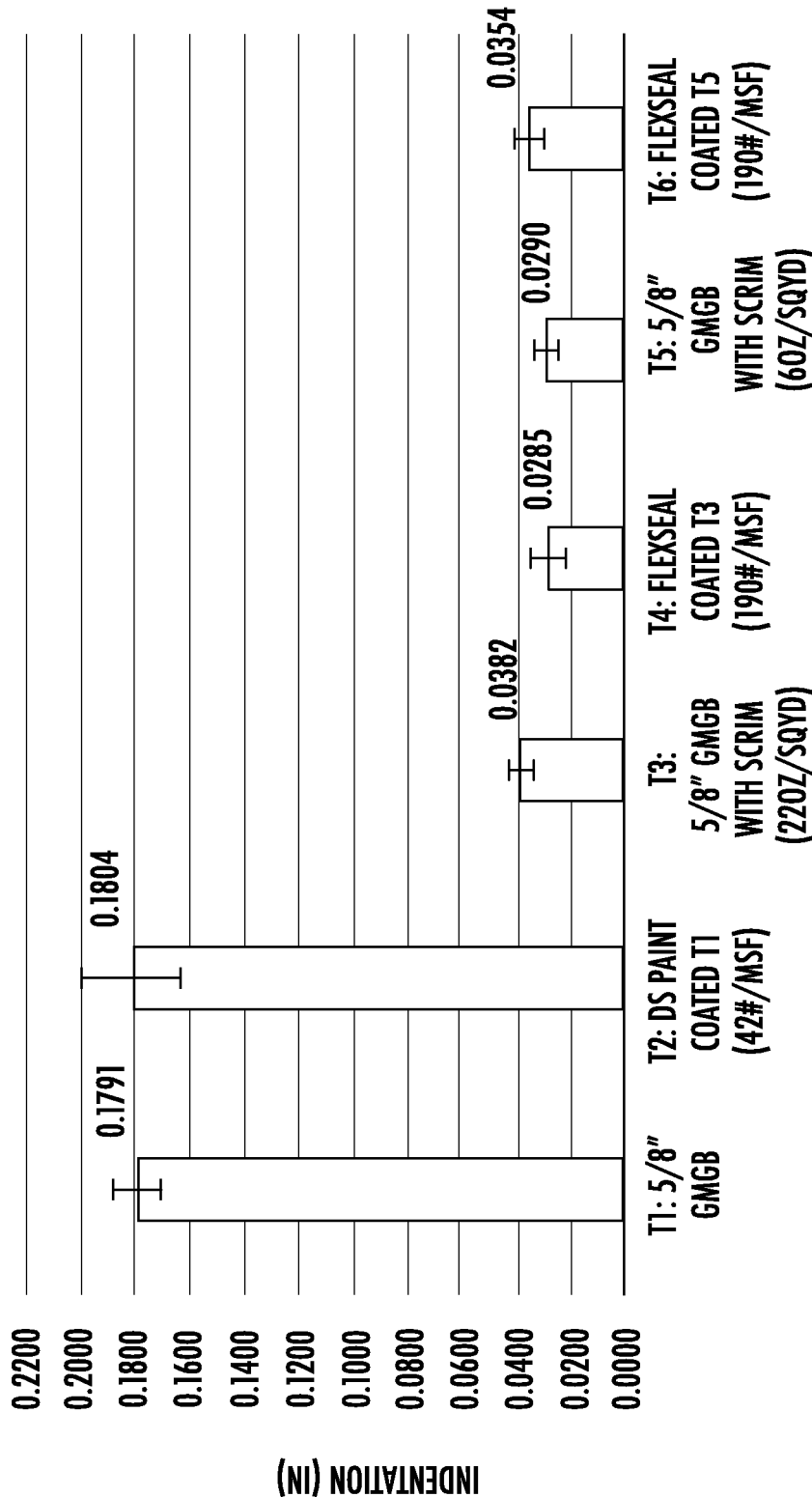
FIG. 26 is a graph showing the results of an indentation test described in the Examples.

In order to validate the MMIT findings, FM 4470 Class 1-VSH (Ice Ball) testing was performed. Accordingly, results confirmed that each of the embedded scrim, heavier core, and the flexible topcoat in a gypsum board provided superior VSH resistance performance in a roof assembly system (i.e., minor crack and indentation). The results of these tests are shown in Table 6 below and FIG. 26.

TABLE 6

FM 4470 Class 1-VSH testing results for different ⅝" GMGB substrates

| | Specimen (2 × 2 ft) | | | | |
|---|---|---|---|---|---|
| | Paint (dry wet) | Board Weight | Fiberglass Scrim | | Indentation | Surface |
| | lb/msf | lb/msf | oz/yd² | Pattern | Inch | Observation |
| T1: ⅝" GMGB | | 2650 | | | 0.1791 | Crack and indentation |
| T2: Water-based paint coated on surface of T1 board | 42 | 2690 | | | 0.1804 | Crack and indentation |

TABLE 6-continued

FM 4470 Class 1-VSH testing results for different ⅝" GMGB substrates

| | Specimen (2 × 2 ft) | | | | |
|---|---|---|---|---|---|
| | Paint (dry wet) | Board Weight | Fiberglass Scrim | | Indentation | Surface |
| | lb/msf | lb/msf | oz/yd² | Pattern | Inch | Observation |
| T3: ⅝" GMGB with embedded scrim close to the back of mat | | 3150 | 22 | Bi-directional | 0.0382 | Minor crack and minor indentation |
| T4: FlexSeal Clear paint coated the surface of T3 board | 190 | 3340 | 22 | Bi-directional | 0.0285 | No crack and minor indentation |
| T5: ⅝" GMGB with embedded scrim laminated to the back of mat | | 3100 | 6 | Tri-directional | 0.0290 | Minor crack and minor indentation |
| T6: FlexSeal Clear paint coated the surface of T5 board | 190 | 3290 | 6 | Tri-directional | 0.0354 | No crack and minor indentation |

Specimen was assembled as following: TPO (60 mil)/T1-T6 Board/PU Foam Adhesive/2.2" ISO Foam/PU Foam Adhesive/¾" Plywood As can be seen, Table 6 and FIG. 26 demonstrate that regular glass mat gypsum roof board or control board ⅝" GMGB (T1) failed to pass VSH testing due to the surface crack and deep indentation. Topcoat water-based coating material paint with less flexibility applied to control board (T2) did not improve impact resistance as the surface crack and deep indentation were also observed. ⅝" GMGB with the embedded fiberglass scrims and heavier cores (T3 and T5) can reduce more than 78% of the surface indentation compared to the control board without scrim (T1) after VSH ice ball testing, but minor surface cracking was still observed. Rubberized or flexible top coating can effectively prevent the cracking of the surface. Flex Seal films significantly improve crack resistance. No surface cracks with minor indentation on T4 and T6 were observed after VSH testing.

Thus, it was surprisingly found that FM Class 1-VSH standard panels may be achieved through a combination of the embedded scrim, heavier core, and/or flexible surface topcoat to achieve very strong impact resistance, while retaining other physical properties of gypsum roof boards, such as wind uplift, water resistance, nail pull, flexural, permeability, etc. In particular, superior construction panels, such as roofing panels, and other panel materials for internal and/or external construction applications, for commercial and/or residential applications, have been developed, in which the construction panels and/or materials contain one or more of: (i) a filamentous scrim in combination with a nonwoven mat facer, (ii) an elastic/flexible surface coating, and (iii) a relatively high panel core density, to provide enhanced hail resistance, including high impact resistance under the standards of the FM 4470 hail resistance classes for Moderate Hail (Class 1-MH), Severe Hail (Class 1-SH), and/or Very Severe Hail (Class 1-VSH).

Wind Uplift Resistance

Gypsum panels having a filamentous scrim associated with a nonwoven mat facer, as disclosed herein, were manufactured and tested for wind uplift performance according to the following examples. The wind uplift testing of products and test materials are laboratory-based comparisons, and thus product performance can vary versus testing at a certified roof testing agency.

First, four ⅝ inch gypsum panels were prepared, as follows: (1) Control 1: control roof panels known to have sufficient wind uplift strength and specifically designed for roofing applications having a first (face side) nonwoven fiberglass mat facer and a second (back, bond side) nonwoven fiberglass mat facer without a scrim; (2) Control 2: control panel specifically designed for internal wall panel applications, having a first nonwoven fiberglass mat facer and a second nonwoven fiberglass mat facer without a scrim, and (3) Experimental 1 and 2: experimental panels having generally the same construction as the Control 2 panels, with a first nonwoven fiberglass mat facer and a second nonwoven fiberglass mat facer, but including a fiberglass scrim disposed between the bulk of the gypsum core and the second mat facer. The Experimental panels had a similar total mat facer weight to Control 1, which was slightly higher than the mat facer weight of Control 2.

Figure 28:
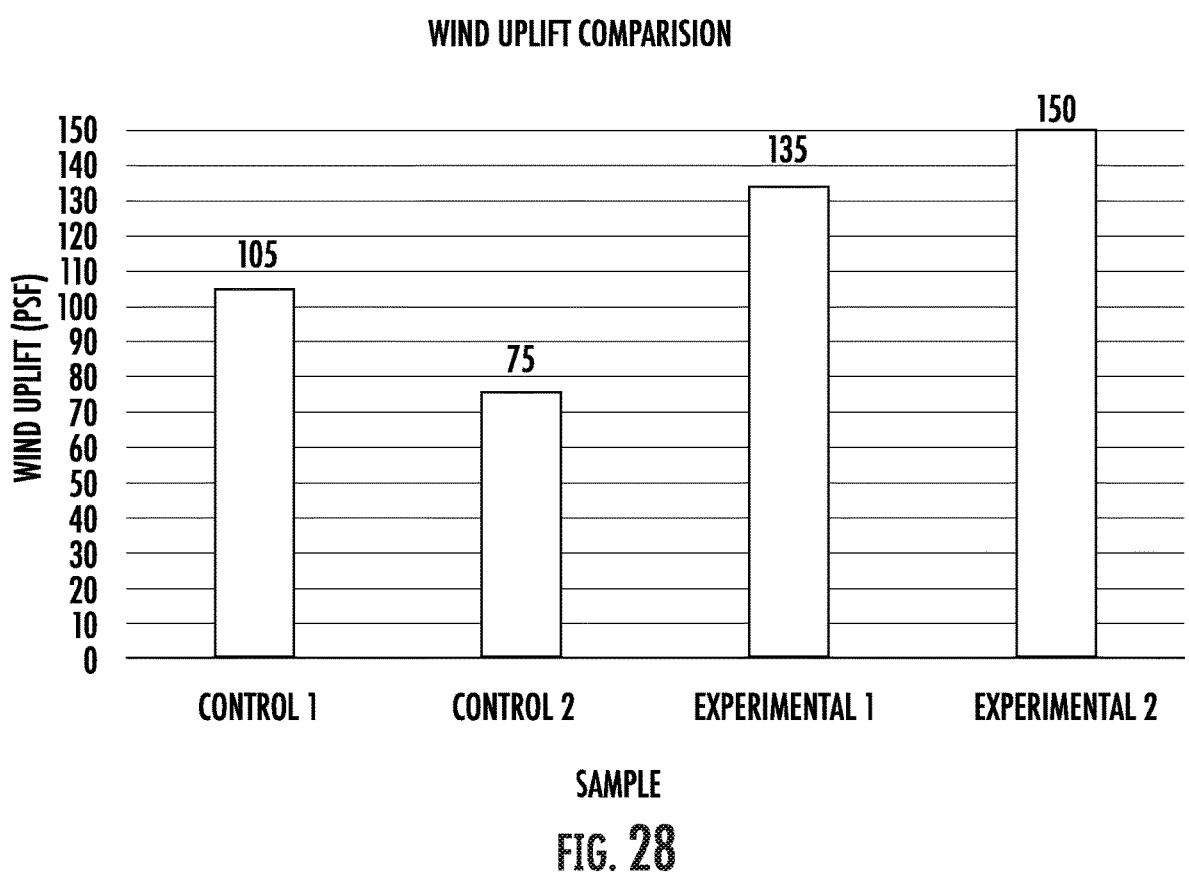
FIG. 28 is a graph showing the results of a wind uplift resistance test described in the Examples.

These panels (4 feet by 8 feet) were installed in a 5 feet by 9 feet built up metal frame test assembly, with the scrim-reinforced second facer side installed to interface with a standard insulation panel, the experimental panel secured by 12 standard fasteners and a roof membrane applied to the side of the panel formed by the first mat facer. This assembly was then coupled to a rubberized seal (6 feet by 10 feet) and a vacuum was pulled in the chamber to replicate the low-pressure system effect of wind passing over a low or no-slope roof. The wind uplift force withstood by each panel was recorded and is shown in FIG. 28. The performed vacuum test provides comparable results to roof assembly tests in which direct pressure is applied on the underside of the panel.

As can be seen, scrimless Control 1 performed as expected, and displayed an uplift tolerance of 105 psf (above 90 psf is considered effective) under laboratory conditions. The scrimless wall panel Control 2 displayed an uplift tolerance of 75 psf, as expected due to its design for internal applications and not external wind resistance. In contrast, Experimental panels 1 and 2 having an added scrim displayed uplift tolerance of 135 and 150 psf, significantly higher (about double) than the uplift tolerance of the similar scrimless panel (Control 2) and much higher than the known control roof panel (Control 1).

Thus, these tests demonstrate that for ⅝ inch panels, a wind uplift resistance of at least 90 lb/ft² may be achieved in a roofing assembly having fewer than 12 fasteners. Beneficially, such results indicate that roof installation materials and labor may be minimized through the use of these panels.

Additional wind uplift tests were performed to compare similar heavy ⅝ inch GMGB panels (T7: control without scrim; T8-T10: with 5.75 oz/yd² biaxial scrim). A single stress plate fastener system (Dekfast 3 inch round metal plate, available from SFS Group USA) was assembled and tested with 4×8 foot boards fastened with 8 fasteners. The failure mode was a fastener pulling through the plate. The results of this test are shown in FIG. 34, which shows that for boards containing a scrim, the panel strength outperforms the fasteners stress plate with high impact fasteners, even using only 8 fasteners. A similar test was performed using double stress plates with high impact fasteners in different numbers, to encourage board failure before pull through. Assemblies using 4, 5, and 6 fasteners were tested. The results are shown in FIG. 35, which illustrates that assemblies using 4 fasteners actually outperformed boards with 5 and 6 fasteners, which is believed to be due to tension due to flexing. A further wind uplift test was performed using 4×4 feet boards with different numbers of fasteners (e.g., 2 and 4). The results are shown in FIG. 36. As can be seen, the presence of the scrim increased the wind uplift performance by 5 levels, relative the control. Overall, it was discovered that even when using industrially low number of fasteners (e.g., 8 or fewer) per panel, panels containing the scrim achieved wind uplift resistance at 150 lb/ft² and higher forces.

Based on the results of these tests, it has been determined that for 4×8 feet panels containing scrims as described herein, the wind uplift rating (lb/ft²) based on the number of fasteners used is or is expected to be (for combinations not tested): 240 lb/ft² for a ⅝ inch thick panel using 8 fasteners, 195 lb/ft² for a ⅝ inch thick panel using 4 fasteners, 195 lb/ft² for a ½ inch thick panel using 8 fasteners, 150 lb/ft² for a ½ inch thick panel using 4 fasteners, 150 lb/ft² for a ¼ inch thick panel using 8 fasteners, 120 lb/ft² for a ¼ inch thick panel using 4 fasteners. These results represent a significant improvement in wind uplift rating for these numbers of fasteners, which allow for material improvements in installation time necessary to install panels meeting these wind uplift ratings.

Thus, in certain embodiments, the roofing panels described herein may display a wind uplift resistance of at least 90 lb/ft², for a ⅝ inch panel secured with fewer than 12 fasteners, such as secured with 10 or 8 fasteners. In certain embodiments, the roofing panels described herein may display a wind uplift resistance of at least 105 lb/ft², for a ⅝ inch panel secured with fewer than 12 fasteners, such as secured with 10 or 8 fasteners. In certain embodiments, the roofing panels described herein may display a wind uplift resistance of at least 135 lb/ft², for a ⅝ inch panel secured with fewer than 12 fasteners, such as secured with 10 or 8 fasteners. In certain embodiments, the roofing panels described herein may display a wind uplift resistance of at least 90 lb/ft², for a ¼ inch panel secured with fewer than 12 fasteners, such as secured with 10 or 8 fasteners. In certain embodiments, the roofing panels described herein may display a wind uplift resistance of at least 105 lb/ft², for a ¼ inch panel secured with fewer than 12 fasteners, such as secured with 10 or 8 fasteners. In certain embodiments, the roofing panels described herein may display a wind uplift resistance of at least 135 lb/ft², for a ¼ inch panel secured with fewer than 12 fasteners, such as secured with 10 or 8 fasteners.

Figure 33:
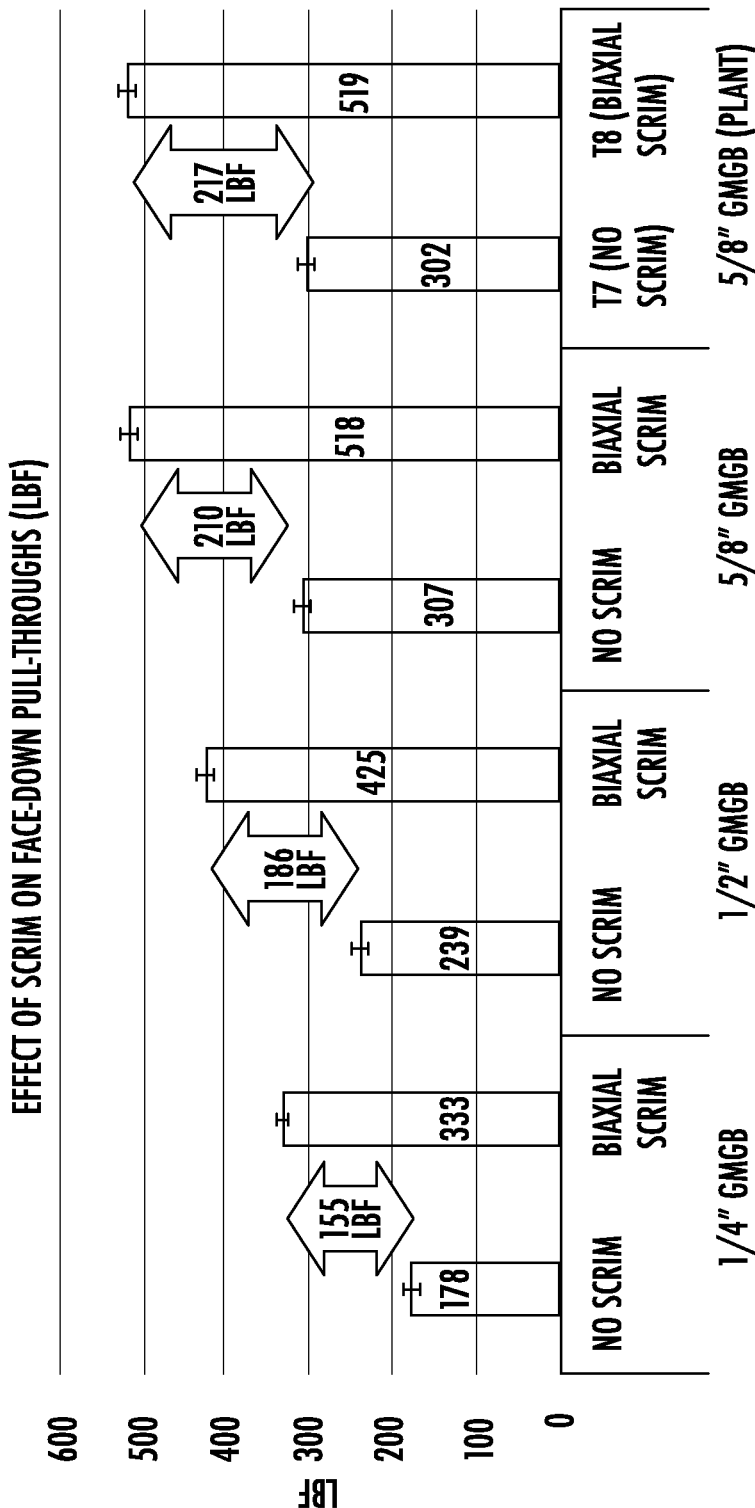
FIG. 33 is a graph showing the results of the pull-through test described in the Examples.

Next, the effect of the scrim on the pull through value for a face-down panel (i.e., the force withstood by the panel before failure of the fastener or board) was measured for GMGBs having various thicknesses, which can be used as a predictor for wind uplift performance. The results are shown in FIG. 33, which revealed that while the pull-through force was generally proportional to board thickness, there was a substantially linear increase in the pull-through force for boards including the scrim.

Thus, the panels having a filamentous scrim described herein may display higher wind uplift resistance than an otherwise identical but scrimless panel secured with the same number of fasteners in an identical roof assembly. Alternatively, the panels described herein may display a similar wind uplift resistance to an otherwise identical but scrimless panel secured with a higher number of fasteners in an identical roof assembly. Beneficially, the need for fewer fasteners when installing the panels described herein requires fewer installation steps and materials.

Accordingly, it was discovered that construction panels having improved strength in the form of wind uplift resistance could be made by incorporating a filamentous scrim into the panel with a nonwoven mat facer. Such panels will provide enhanced strength performance to inclement weather without requiring additional installation steps.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A roofing panel, comprising:
a set gypsum core;
a filamentous scrim associated with the set gypsum core, the filamentous scrim comprising a mesh constructed of elongated fiberglass yarns defining a plurality of openings therebetween, wherein the mesh comprises two sets of approximately parallel elongated fiberglass yarns spaced from one another, with the two sets being disposed approximately perpendicularly to one another, wherein each of the elongated fiberglass yarns has a width or diameter of from about 0.05 inch to about 0.5 inch, wherein the filamentous scrim has a weight of from about 4 oz/yd² to about 25 oz/yd²; and
a nonwoven fiberglass mat facer associated with the filamentous scrim,
wherein the roofing panel displays a wind uplift resistance between 120 lb/ft² and 270 lb/ft², for a ¼ or ⅝-inch panel on a roofing assembly having 8 or fewer fasteners.

2. The roofing panel of claim 1, wherein each of the plurality of openings has an area of from about 0.01 in² to about 0.5 in².

3. The roofing panel of claim 1, wherein the approximately parallel elongated fiberglass yarns within each set are spaced from one another at a distance of from about 0.1 inch to about 0.5 inch.

4. The roofing panel of claim 1, wherein the nonwoven fiberglass mat facer has a basis weight of from about 1.5 pounds to about 4.0 pounds per 100 square feet of the mat.

5. The roofing panel of claim 1, further comprising an elastic coating on a surface of the nonwoven fiberglass mat facer opposite the gypsum core.

6. The roofing panel of claim 5, wherein the elastic coating comprises an elastomeric acrylic co-polymer/resin, polyvinyl butyral, polyurea/polyurethane hybrid, polyurethane elastomer, synthetic rubber, and/or a rubberized/elastomeric coating material.

7. The roofing panel of claim 5, wherein the elastic coating has a thickness of from about 1 mil to about 30 mils.

8. The roofing panel of claim 1, wherein the wind uplift resistance is 195 lb/ft², for a ⅝-inch panel on a roofing assembly having 8 or fewer fasteners.

9. The roofing panel of claim 1, wherein the roofing panel meets the Class-1 FM 4470 VSH (Very Severe Hail) standard.

10. A method of manufacturing a roofing panel, comprising:
associating a filamentous scrim with a nonwoven fiberglass mat facer, the filamentous scrim comprising a mesh constructed of elongated fiberglass yarns defining a plurality of openings therebetween, wherein the mesh comprises two sets of approximately parallel elongated fiberglass yarns spaced from one another, with the two sets being disposed approximately perpendicularly to one another, wherein each of the elongated fiberglass yarns has a width or diameter of from about 0.05 inch to about 0.5 inch, wherein the filamentous scrim has a weight of from about 4 oz/yd² to about 25 oz/yd²;
associating the filamentous scrim and nonwoven fiberglass mat facer with a gypsum slurry; and
allowing the gypsum slurry to set to form at least a portion of a set gypsum core,
wherein the roofing panel displays a wind uplift resistance of between 120 lb/ft² and 270 lb/ft², for a ¼ or ⅝-inch panel on a roofing assembly having 8 or fewer fasteners.

11. The method of claim 10, wherein associating the filamentous scrim with the nonwoven fiberglass mat facer occurs simultaneously with associating the filamentous scrim and the nonwoven fiberglass mat facer with the gypsum slurry.

12. The method of claim 10, wherein associating the filamentous scrim with the nonwoven fiberglass mat facer occurs prior to associating the filamentous scrim and the nonwoven fiberglass mat facer with the gypsum slurry.

13. The method of claim 10, further comprising applying an elastic coating to a surface of the nonwoven fiberglass mat facer opposite the gypsum core.

14. The method of claim 10, wherein associating the filamentous scrim and the nonwoven fiberglass mat facer with the gypsum slurry comprises depositing at least one gypsum slurry onto the filamentous scrim.

15. The method of claim 10, wherein the wind uplift resistance is 195 lb/ft², for a ⅝-inch panel on a roofing assembly having 8 or fewer fasteners.

16. The method of claim 10, wherein the roofing panel meets the Class-1 FM 4470 VSH (Very Server Hail) standard.

17. The roofing panel of claim 1, wherein each of the elongated fiberglass yarns has a width of from 0.05 inch to 0.132 inch.

18. The roofing panel of claim 1, wherein each of the elongated fiberglass yarns has a thickness of from 0.012 inch to 0.391 inch.

19. The roofing panel of claim 1, wherein the nonwoven fiberglass mat facer has a thickness of from about 10 mils to about 50 mils.

20. The roofing panel of claim 1, wherein each of the elongated fiberglass yarns displays a percent elongation of from about 3 to about 5.

21. The roofing panel of claim 1, wherein the approximately parallel elongated fiberglass yarns within each set are spaced from one another at about 2 to about 3 yarn ends per inch.

22. The roofing panel of claim 1, wherein each of the plurality of openings has an area of from about 0.018 in² to about 0.175 in².

23. The roofing panel of claim 1, wherein each elongated yarn of the filamentous scrim is formed of from about 4 to about 12 elongated filaments.

24. The roofing panel of claim 1, wherein the set gypsum core or a majority layer thereof has a density of from about 45 lbs/ft³ to about 80 lbs/ft³.

25. The roofing panel of claim 1, wherein the set gypsum core or a majority layer thereof has a density of from about 48 lbs/ft³ to about 68 lbs/ft³.

26. A roofing panel, comprising:
a set gypsum core;
a filamentous scrim associated with the set gypsum core, the filamentous scrim comprising a mesh constructed of elongated fiberglass yarns defining a plurality of openings therebetween, wherein the mesh comprises two sets of approximately parallel elongated fiberglass yarns spaced from one another, with the two sets being disposed approximately perpendicularly to one another, wherein each of the elongated fiberglass yarns has a width or diameter of from about 0.05 inch to about 0.5 inch, wherein the filamentous scrim has a weight of from about 4 oz/yd² to about 25 oz/yd²; and
a nonwoven fiberglass mat facer associated with the filamentous scrim, wherein the nonwoven fiberglass mat facer has a weight of from about 2.2 oz/yd² to about 5.8 oz/yd², wherein nonwoven fiberglass mat facer has a thickness of from about 10 mils to about 50 mils,
wherein the roofing panel displays a wind uplift resistance of between 120 lb/ft² and 270 lb/ft², for a ¼ or ⅝-inch panel on a roofing assembly having 8 or fewer fasteners.

27. The roofing panel of claim 1, wherein the nonwoven fiberglass mat facer has a weight of from about 2.2 oz/yd² to about 5.8 oz/yd².

28. The roofing panel of claim 26, wherein the wind uplift resistance is between 150 lb/ft² and 210 lb/ft², for a ⅝-inch panel on a roofing assembly having 6 or fewer fasteners.

29. The roofing panel of claim 1, wherein the wind uplift resistance is between 150 lb/ft$^2$ and 210 lb/ft$^2$, for a ⅝-inch panel on a roofing assembly having 6 or fewer fasteners.

30. The method of claim 10, wherein the wind uplift resistance is between 150 lb/ft$^2$ and 210 lb/ft$^2$, for a ⅝-inch panel on a roofing assembly having 6 or fewer fasteners.

31. The roofing panel of claim 1, wherein the wind uplift resistance is 210 lb/ft$^2$, for a ⅝-inch panel on a roofing assembly having 4 or fewer fasteners.

32. The method of claim 10, wherein the wind uplift resistance is 210 lb/ft$^2$, for a ⅝-inch panel on a roofing assembly having 4 or fewer fasteners.

* * * * *